US012664899B2

(12) United States Patent
Park et al.

(10) Patent No.: US 12,664,899 B2
(45) Date of Patent: Jun. 23, 2026

(54) 3D SPACE DATA GENERATION METHOD, DEVICE AND COMPUTER PROGRAM FOR FLIGHT GUIDANCE OF AIRCRAFT

(71) Applicant: THINKWARE CORPORATION, Seongnam-si (KR)

(72) Inventors: Yo Sep Park, Seongnam-si (KR); Suk Pil Ko, Seongnam-si (KR); Shin Hyoung Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 193 days.

(21) Appl. No.: 18/107,709

(22) Filed: Feb. 9, 2023

(65) Prior Publication Data

US 2023/0410666 A1 Dec. 21, 2023

(30) Foreign Application Priority Data

Feb. 9, 2022 (KR) ........................ 10-2022-0017076
Feb. 9, 2023 (KR) ........................ 10-2023-0017620

(51) Int. Cl.

*G08G 5/00* (2025.01)
*G08G 5/34* (2025.01)
*G08G 5/55* (2025.01)
*G08G 5/57* (2025.01)

(Continued)

(52) U.S. Cl.

CPC ................ *G08G 5/34* (2025.01); *G08G 5/55* (2025.01); *G08G 5/57* (2025.01); *G08G 5/59* (2025.01); *G08G 5/80* (2025.01)

(58) Field of Classification Search

CPC .... G08G 5/0039; G08G 5/006; G08G 5/0069; G08G 5/045; G08G 5/00; G08G 5/0013; G08G 5/0026; G08G 5/0034; G08G 5/0052; G08G 5/0086; G08G 5/34; G08G 5/55; G08G 5/57; G08G 5/59; G08G 5/80; G08G 5/22; G08G 5/26; G08G 5/32; G08G 5/53; G08G 5/74; G01C 21/3863; G01C 21/24;

(Continued)

(56) References Cited

U.S. PATENT DOCUMENTS 4,862,373 A * 8/1989 Meng ................ G01C 21/3878 701/410
5,548,515 A * 8/1996 Pilley ...................... G01S 19/15 342/36

(Continued)

FOREIGN PATENT DOCUMENTS

CN 120540331 A * 8/2025 ............ G05D 1/648

OTHER PUBLICATIONS

Yuan, Meng-shun, and Mou Chen. "Improved lazy theta algorithm based on octree map for path planning of UAV." Defence Technology 23 (2023): 8-18. (Year: 2023).*

(Continued)

*Primary Examiner* — Angelina M Shudy
(74) *Attorney, Agent, or Firm* — WHDA, LLP

(57) ABSTRACT

A 3D space data generation method for flight of an aerial vehicle may include receiving map data for a 3D space in which the aerial vehicle flies, and dividing a space into a flight area in which the aerial vehicle flies and a restricted area in which the aerial vehicle does not fly based on the map data and dividing the flight area and the restricted area into each unit area to generate 3D space data.

19 Claims, 16 Drawing Sheets

Notional UAM Architecture(100)

(51) Int. Cl.
*G08G 5/59* (2025.01)
*G08G 5/80* (2025.01)

(58) Field of Classification Search
CPC ... G01C 21/3826; G01C 21/3885; G05D 1/00
See application file for complete search history.

(56) References Cited

U.S. PATENT DOCUMENTS

| | | | | | |
|---|---|---|---|---|---|
| 5,740,047 | A * | 4/1998 | Pilley | G08G 5/0013 342/36 |
| 7,733,243 | B2 * | 6/2010 | Bitar | G01C 23/00 340/961 |
| 8,090,526 | B2 * | 1/2012 | Marty | G08G 5/32 701/411 |
| 9,262,929 | B1 * | 2/2016 | Roy | G08G 5/55 |
| 9,542,849 | B1 * | 1/2017 | Bertram | G08G 5/55 |
| 9,601,022 | B2 * | 3/2017 | Taveira | G05D 1/106 |
| 10,509,418 | B1 * | 12/2019 | Jakusz | G08G 5/53 |
| 11,262,746 | B1 * | 3/2022 | Van Duren | B64U 20/80 |
| 11,442,164 | B2 * | 9/2022 | Dillard | G01S 13/953 |
| 11,640,764 | B1 * | 5/2023 | Alonso Lopez | G08G 5/21 701/7 |
| 11,928,979 | B2 * | 3/2024 | Reinquin | G08G 5/25 |
| 12,125,392 | B1 * | 10/2024 | Colpitts | G06Q 10/08355 |
| 12,217,611 | B1 * | 2/2025 | Ahmed | G08G 5/26 |
| 12,254,779 | B2 * | 3/2025 | Contreras | G05D 1/0274 |
| 2005/0173594 | A1 * | 8/2005 | Viebahn | B64D 45/0031 244/118.5 |
| 2006/0293840 | A1 * | 12/2006 | Klein | G08G 5/00 715/850 |
| 2008/0306680 | A1 * | 12/2008 | Marty | G08G 5/32 701/533 |
| 2009/0149990 | A1 * | 6/2009 | Myeong | G05D 1/0274 701/25 |
| 2010/0121574 | A1 * | 5/2010 | Ariyur | G08G 5/0069 701/301 |
| 2014/0379179 | A1 * | 12/2014 | Goossen | G08G 5/025 701/16 |
| 2015/0279219 | A1 * | 10/2015 | Gillet | G06V 20/58 701/301 |
| 2016/0011741 | A1 * | 1/2016 | Khatwa | G08G 5/21 715/765 |
| 2016/0132056 | A1 * | 5/2016 | Yoshino | G01S 7/4808 701/23 |
| 2016/0140851 | A1 * | 5/2016 | Levy | G08G 5/34 701/410 |
| 2016/0180720 | A1 * | 6/2016 | Auletto | G01C 23/00 701/533 |
| 2016/0210863 | A1 * | 7/2016 | Kohn-Rich | G08G 5/0034 |
| 2017/0263132 | A1 * | 9/2017 | Butler | G08G 5/0026 |
| 2017/0263134 | A1 * | 9/2017 | Blomberg | G08G 5/0039 |
| 2017/0337824 | A1 * | 11/2017 | Chen | G08G 5/0086 |
| 2018/0218214 | A1 * | 8/2018 | Pestun | G06V 20/176 |
| 2018/0247544 | A1 * | 8/2018 | Mustafic | H04W 48/04 |
| 2018/0253979 | A1 * | 9/2018 | Rey | G08G 5/0069 |
| 2019/0103031 | A1 * | 4/2019 | Evans | G08G 5/0091 |
| 2019/0108680 | A1 * | 4/2019 | Querejeta Masaveu | G08G 5/59 |
| 2019/0156684 | A1 * | 5/2019 | Pohl | G08G 5/0021 |
| 2019/0272665 | A1 * | 9/2019 | X | G06T 15/08 |
| 2019/0311636 | A1 * | 10/2019 | Fanelli | G08G 5/32 |
| 2019/0325756 | A1 * | 10/2019 | Cleaver | G08G 5/0034 |
| 2020/0020236 | A1 * | 1/2020 | Zhou | G08G 5/006 |
| 2020/0043350 | A1 * | 2/2020 | Cantrell | G08G 5/006 |
| 2020/0160732 | A1 * | 5/2020 | Nakadai | G08G 5/26 |
| 2020/0264009 | A1 * | 8/2020 | Wills | G06F 9/451 |
| 2020/0334996 | A1 * | 10/2020 | Estkowski | G08G 5/0008 |
| 2020/0409375 | A1 * | 12/2020 | Bowe | G06F 16/29 |
| 2020/0410879 | A1 * | 12/2020 | Reinquin | G08G 5/21 |
| 2021/0084312 | A1 * | 3/2021 | Lasang | H04N 19/184 |
| 2021/0150917 | A1 * | 5/2021 | Kubie | G05D 1/689 |
| 2021/0173415 | A1 * | 6/2021 | Cajias | G06V 10/95 |
| 2021/0192963 | A1 * | 6/2021 | Ophir | G08G 5/0021 |
| 2021/0225179 | A1 * | 7/2021 | Cleaver | G01C 21/20 |
| 2021/0263537 | A1 * | 8/2021 | Belt | G08G 5/26 |
| 2021/0280072 | A1 * | 9/2021 | Ortlieb | G08G 5/0086 |
| 2021/0295715 | A1 * | 9/2021 | Gia | G05D 1/0646 |
| 2021/0358310 | A1 * | 11/2021 | Sachs | G08G 5/0086 |
| 2022/0309934 | A1 * | 9/2022 | Panchangam | G08G 5/0052 |
| 2022/0327937 | A1 * | 10/2022 | Ayhan | G08G 5/55 |
| 2022/0348325 | A1 * | 11/2022 | Peng | G08G 5/0069 |
| 2022/0392353 | A1 * | 12/2022 | Contreras | G05D 1/106 |
| 2023/0058999 | A1 * | 2/2023 | Kwon | G01C 21/206 |
| 2023/0061528 | A1 * | 3/2023 | Stenneth | G01C 21/3841 |
| 2023/0089977 | A1 * | 3/2023 | Venkatesh | G08G 5/26 701/120 |
| 2023/0122583 | A1 * | 4/2023 | Katsuki | G08G 5/55 701/528 |
| 2023/0237917 | A1 * | 7/2023 | Schuppenhauer | G08G 5/045 701/120 |
| 2023/0394981 | A1 * | 12/2023 | Benedek | G08G 5/006 |
| 2025/0085714 | A1 * | 3/2025 | Zhang | G05D 1/49 |
| 2025/0376268 | A1 * | 12/2025 | Aubignac | B64D 45/04 |
| 2025/0390114 | A1 * | 12/2025 | Kim | G05D 1/693 |

OTHER PUBLICATIONS

CN-120540331-A machine translation (Year: 2025).*

* cited by examiner (b)

3D SPACE DATA GENERATION METHOD, DEVICE AND COMPUTER PROGRAM FOR FLIGHT GUIDANCE OF AIRCRAFT

BACKGROUND

1. Field

The technical idea of the present disclosure relates to a 3D space data generation method, device, and computer program for flight guidance of an aerial vehicle.

2. Description of Related Art

Urban air mobility (UAM) may be a next-generation mobility solution that maximizes mobility efficiency in the urban area, and has emerged to solve the rapid increase in social costs or the like such as reduced movement efficiency and logistics transportation costs due to congested traffic jam in the urban area.

In modern times where long-distance travel time has increased and traffic jam has worsened, the UAM solving these problems is considered a future innovation business.

The operation of the initial UAM used a new airframe type certified for flight in the current operating regulations and environment. For the introduction of the UAM operations, innovations in related regulations and UAM dedicated flight corridors may be introduced. New operating regulations and infrastructure enable highly autonomous traffic management.

Due to the increase in ground traffic every year, the time required for travel becomes longer, resulting in considerable economic cost loss. As a concept of city-centered air transportation that has been continuously discussed for this purpose, the limitations of the existing helicopter-type transportation have not been resolved, and as a result, high costs of operation and customer service and negative public perceptions of noise and pollution have hampered significant market growth.

This has led to the search for alternative transportation means, and the evolution of modern technology has made it possible to support the development of the concept of the UAM. In this sense, the introduction of the concept of the UAM suggests a new approach to alternative air transportation means in the urban area.

The UAM aerial vehicle is generally transportation means that constructs a next-generation advanced transportation system that safely and conveniently transports people and cargo in the urban environment based on electric power, low-noise aircraft, and a vertical take-off and landing pad. The reason why the above-described low noise and vertical take-off and landing should be premised is to increase the movement efficiency when operated in the urban area.

Due to the activation and commercialization of such unmanned aerial vehicle, there is an increasing demand for effectively controlling and managing the unmanned aerial vehicle. To this end, in order to allow the UAV to fly or to effectively manage the path of the UAV in flight, map data for the 3D space in which the UAV is flying is required.

Unlike map data generally used for vehicles, the map data used for the unmanned aerial vehicle includes various data on a 3D space, and thus requires a lot of resources for data processing.

In the past, the 3D map data was simply generated to reduce data processing load, but in this case, there may be a problem in that the accuracy of flight guidance of the unmanned aerial vehicle may be lowered.

Accordingly, there is a need for a 3D space data generation method capable of reducing data processing load while providing accurate flight guidance of unmanned aerial vehicle.

SUMMARY

The present disclosure is to provide a 3D space data generation method, device, and computer program for flight guidance of an aerial vehicle.

The present disclosure is to provide a method for generating and providing a flight path using 3D space data.

In an aspect of the present disclosure, a 3D space data generation method for flight of an aerial vehicle includes: receiving map data for a 3D space in which the aerial vehicle flies; and generating 3D space data by dividing a space into a flight area in which the aerial vehicle flies and a restricted area in which the aerial vehicle does not fly based on the map data and dividing the flight area and the restricted area into each unit area.

The map data may include 3D geospatial information about the 3D space and obstacle information located in the 3D space.

In the generating of the 3D space data, the flight area may be divided into a first unit area and the restricted area may be divided into a second unit area, and the first unit area and the second unit area may have different sizes.

The 3D space data generation method may further include generating a flight route of the aerial vehicle using the 3D space data and operational information of the aerial vehicle.

In the generating of the flight route, the flight route may be generated based on the flight area within the 3D space data.

The 3D space data generation method may further include: adjusting the unit area size of the flight area in the 3D space data based on the flight route.

In the adjusting, when the flight route is adjacent to the restricted area, the unit area size of the flight area adjacent to the restricted area may be adjusted.

In the adjusting, the unit area size of the flight area may be adjusted based on a flight speed and a flight direction of the aerial vehicle.

In the adjusting, the unit area size of the flight area may be adjusted based on the size of the aerial vehicle.

In another aspect of the present disclosure, a 3D space data generation device for flight of an aerial vehicle includes: a data receiving unit receiving map data for a 3D space in which the aerial vehicle flies; and a 3D space data generation unit generating 3D space data by dividing a space into a flight area in which the aerial vehicle flies and a restricted area in which the aerial vehicle does not fly based on the map data and dividing the flight area and the restricted area into each unit area.

The map data may include 3D geospatial information about the 3D space and obstacle information located in the 3D space.

The 3D space data generation unit may divide the flight area into a first unit area and divides the restricted area into a second unit area, and the first unit area and the second unit area may have different sizes.

The 3D space data generation device may further include a flight route generation unit generating a flight route of the aerial vehicle using the 3D space data and operational information of the aerial vehicle.

The flight route generation unit may generate the flight route based on the flight area within the 3D space data.

The 3D space data generation device may further include: a unit area adjusting unit adjusting the unit area size of the flight area in the 3D space data based on the flight route.

When the flight route is adjacent to the restricted area, the unit area adjusting unit may adjust the unit area size of the flight area adjacent to the restricted area.

The unit area adjusting unit may adjust the unit area size of the flight area based on a flight speed and a flight direction of the aerial vehicle.

The unit area adjusting unit may adjust the unit area size of the flight area based on the size of the aerial vehicle.

A computer program stored in a computer readable recording medium according to an embodiment of the present disclosure for achieving the above object may include program code for executing the above-described 3D space data generation method.

In addition, a computer-readable recording medium according to an embodiment of the present disclosure for achieving the above object may have a program recorded thereon to execute the above-described 3D space data generation method.

DETAILED DESCRIPTION

Hereinafter, detailed embodiments of the present disclosure will be described with reference to the accompanying drawings. The following detailed descriptions are provided to help a comprehensive understanding of methods, devices and/or systems described herein. However, the embodiments are described by way of examples only and the present disclosure is not limited thereto.

In describing the embodiments of the present disclosure, when a detailed description of well-known technology relating to the present disclosure may unnecessarily make unclear the spirit of the present disclosure, a detailed description thereof will be omitted. Further, the following terminologies are defined in consideration of the functions in the present disclosure and may be construed in different ways by the intention of users and operators. Therefore, the definitions thereof should be construed based on the contents throughout the specification. The terms used in the detailed description is merely for describing the embodiments of the present disclosure and should in no way be limited. Unless clearly used otherwise, an expression in the singular form includes the meaning of the plural form. In this description, expressions such as "including" or "comprising" are intended to indicate certain characteristics, numbers, steps, operations, elements, some or combinations thereof, and it should not be interpreted to exclude the existence or possibility of one or more other characteristics, numbers, steps, operations, elements, parts or combinations thereof other than those described.

In addition, terms 'first', 'second', A, B, (a), (b), and the like, will be used in describing components of embodiments of the present disclosure. These terms are used only in order to distinguish any component from other components, and features, sequences, or the like, of corresponding components are not limited by these terms.

Urban air mobility (UAM) used throughout this specification comprehensively refers to an urban transportation system that transports people and cargo using aircraft rather than ground transportation means. An airframe applied to a UAM operation may include a fixed-wing aircraft and personal air vehicle (PAV) type capable of horizontal take-off and landing, also known as vertical take-off and landing (VTOL) or conventional take-off and landing (CTOL).

More specifically, the urban air mobility (UAM) enables highly automated, passenger- and cargo-transporting air transport services in and around the urban area.

Urban air traffic is an aggregation of advanced air mobility (AAM) being developed by governments and industries. The AAM enables transportation of people and cargo in regional, local, international and urban environments. Among those, the UAM is being operated to suit movement in the urban area.

Figure 1:
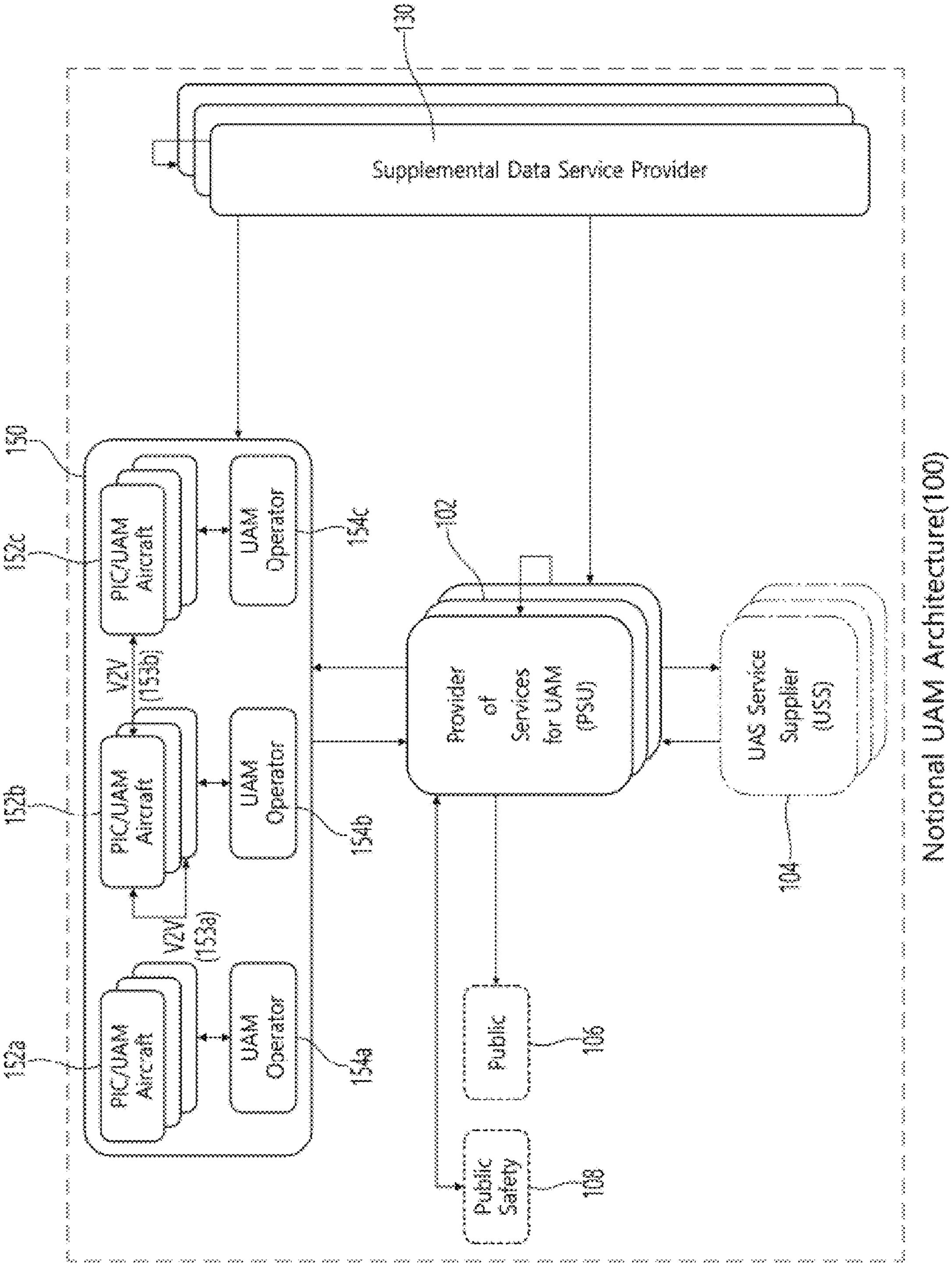
FIG. 1 is a diagram illustrating a conceptual architecture of UAM according to an embodiment of the present disclosure.

FIG. 1 is a diagram illustrating a conceptual architecture of UAM according to an embodiment of the present disclosure. Hereinafter, referring to FIG. 1, a conceptual architecture 100 of UAM that may be defined in an environment for UAM operation management will be described.

First, terms generally used in this specification will be defined to help understanding of the present disclosure.

A UAM aerodrome refers to a location where a UAM flight operation departs and arrives, a UAM aerial vehicle refers to aircraft capable of performing a UAM operation, a UAM flight corridor is a three-dimensional airspace with performance requirements for operating at a location where tactical air traffic control (ATC) separation services are not provided or are crossed, and an airspace assigned for flight of a UAM aerial vehicle to prevent collisions between a non-UAM aerial vehicle and the UAM aerial vehicle.

The UAM operation refers to transporting passengers and/or cargo from a UAM aerodrome at any one location to a UAM aerodrome at another location.

The UAM operation information includes, but not limited thereto, as information necessary for UAM operation, UAM operation identification information, UAM flight corridor information to be flown, UAM aerodrome information, and UAM operation event information (UAM aerodrome departure time, arrival time, etc.

A UAM operator represents an organization that manages overall UAM operations and performs each UAM operation. The UAM operator corresponds to a server that includes a network unit for managing a flight plan (or intent) of each UAM or a PIC UAM aerial vehicle and transmitting and receiving real-time information to and from each UAM or the PIC UAM aerial vehicle, a storage unit for storing information necessary for flight of each UAM/PIC UAM, a processor for monitoring the flight of each UAM/PIC UAM aerial vehicle and controlling autonomous flight, and a display unit for displaying a flight status of each UAM/PIC UAM aerial vehicle in real time.

An unmanned aircraft system traffic management (UTM) operator is an operator who utilizes UTM-specific services to perform low-altitude unmanned aircraft system (UAS) operation, and corresponds to a server that includes a network unit for transmitting and receiving information to and from each aerial vehicle in real time, a storage unit for storing information necessary for each flight, a processor for monitoring the flight of each aerial vehicle and controlling autonomous flight, and a display unit for displaying a flight status of each aerial vehicle in real time.

In general, since aircraft tends to comply with the regulations of ICAO and the Federal Aviation Administration (FAA), which are international organizations, this specification will also describe the UAM concept from the viewpoint of the FAA establishing regulations for safe operation of UAM.

First, in order to prevent accidents such as a midair collision between the UAM aerial vehicle or between the UAM aerial vehicle and the non-UAM aerial vehicle, it should be possible for the UAM operators to access FAA National Airspace System (NAS) data through FAA-industry data exchange protocols.

This approach enables authenticated data flow between the UAM operators and FAA operating systems. Referring to FIG. 1, UAM operators 154*a*, 154*b*, and 154*c* according to the present disclosure may be configured by a distributed network utilizing an interoperable information system.

In addition, the UAM operators 154*a*, 154*b*, and 154*c* may perform the UAM operation in a scheduled service or on-demand service method through a request of an individual customer or an intermodal operator.

The UAM operators 154*a*, 154*b*, and 154*c* are responsible for all aspects of regulatory compliance and UAM operational execution.

Hereinafter, the use of the term "operator" in this specification refers to an airspace user who has chosen to be operated through cooperative management within the UAM environment. More specifically, the operator may include a UAM operating system including electronic devices that include a processor, memory, database, network interface, communication module, etc., that are connected to a wired/wireless network to perform various controls and management required for the UAM operation.

The UAM operators 154*a*, 154*b*, and 154*c* may be closely connected to PIC/UAM aerial vehicles 152*a*, 152*b*, and 152*c* to exchange various information (flight corridor information, airframe condition information, weather information, aerodrome information, arrival time, departure time, map data, etc.) for flight of the plurality of PIC/UAM aerial vehicles 152*a*, 152*b*, and 152*c* in real time.

A volume of a group of the PIC/UAM aerial vehicles 152*a*, 152*b*, and 152*c* that each of the UAM operators 154*a*, 154*b*, and 154*c* may manage may be set differently according to the capability of the UAM operators 154*a*, 154*b*, and 154*c*. In this case, the capability information of the UAM operators 154*a*, 154*b*, and 154*c* may include the number of UAM aerial vehicles that may be accessed simultaneously, the number of UAM aerial vehicles that may be controlled simultaneously, a network traffic processing speed, processor capability of a server system, and a range of a control area, etc.

Among the plurality of PIC/UAM aerial vehicles 152*a*, 152*b*, and 152*c*, the PIC/UAM aerial vehicle controlled by the same UAM operators 154*a*, 154*b*, and 154*c* may each be grouped into one group and managed. In addition, inter-airframe vehicle to vehicle (V2V) communication 153*a* may be performed between the PIC/UAM aerial vehicles 152*a*, 152*b*, and 152*c* within the grouped group, and information related to operation may be shared through V2V communication between the PIC/UAM aerial vehicles 152*a*, 152*b*, and 152*c* included in different groups.

To determine desired UAM operational flight plan information such as location of flight (e.g., aerodrome locations), route (e.g., specific UAM corridor(s)), and desired flight time, the UAM operators 154*a*, 154*b*, and 154*c* acquire current status/conditions from at least one of information (environment, situational awareness information, strategic operational demand information, and UAM aerodrome availability) that a PSU 102 and a supplemental data service provider (SDSP) 130 provide.

The UAM operators 154*a*, 154*b*, and 154*c* should provide the flight plan and navigation data to the PSU 102 to be operated within or cross the UAM flight corridor.

In addition, the UAM operators 154*a*, 154*b*, and 154*c* should set planning data in advance for proper preparation when an off-nominal event occurs. The planning data includes understanding of alternative landing sites and the airspace classes bordering the UAM flight corridor(s) for operations.

When all preparations for the UAM operation are completed, the UAM operators 154*a*, 154*b*, and 154*c* provide the information related to the corresponding UAM operation to the PSU 102. In this case, the UAM operators 154*a*, 154*b*, and 154*c* may suspend or cancel the flight of the UAM aerial vehicle until a flight permission message is received from the PSU 102. In another embodiment, even if the UAM operators 154*a*, 154*b*, and 154*c* do not receive the flight permission message from the PSU 102, the UAM operators 154*a*, 154*b*, and 154*c* may start the flight of the UAM aerial vehicle by themselves.

In FIG. 1, the pilot in command (PIC) represents a case where a person responsible for operation and safety of the UAM in flight is on board the UAM aerial vehicle.

The provider of services for UAM (PSU) 102 may serve as an agency that assists the UAM operators 154*a*, 154*b*, and 154*c* to meet UAM operational requirements for safe and efficient use of airspace.

In addition, the PSU 102 may be closely connected with stakeholders 108 and the public 106 for public safety.

To support the capability of the UAM operators 154*a*, 154*b*, and 154*c* to meet the regulations and operating procedures for the UAM operation, the PSU 102 provides a communication bridge between UAMs and a communication bridge between PSUs and other PSUs through the PSU network 206.

The PSU 102 collects the information on the UAM operation planned for the UAM flight corridor through the PSU network 206, and provides the collected information to the UAM operators 154*a*, 154*b*, and 154*c* to confirm the duty performance capability of the UAM operators 154*a*, 154*b*, and 154*c*. Also, the PSU 102 receives/exchanges the information on the UAM aerial vehicles 152*a*, 152*b*, and 152*c* through the UAM operators 154*a*, 154*b*, and 154*c* during the UAM operation.

The PSU 102 provides the confirmed flight plan to other PSUs through the PSU network 206.

In addition, the PSU 102 distributes notification of an operating area in the flight plan (constraints, restrictions), FAA operational data and advisories, and weather and additional data to the UAM operators 154*a*, 154*b*, and 154*c*.

The PSU 102 may acquire UTM flight information through a UAS service supplier (USS) 104 network, and the USS network may acquire the UAM flight information through the PSU network 206.

In addition, the UAM operators 154*a*, 154*b*, and 154*c* may confirm the flight plan shared through the PSUs 102 and other UAM operators, and flight plan information for other flights in the vicinity, thereby controlling safer UAM flights.

The PSU 102 may be connected to other PSUs through the PSU networks 206 to acquire subscriber information, FAA data, SDSP data, and USS data.

The UAM operators 154*a*, 154*b*, and 154*c* and the PSU 102 may use the supplemental data service provider (SDSP) 130 to access support data including terrain, obstacles, aerodrome availability, weather information, and map data for a three-dimensional space. The UAM operators 154*a*, 154*b*, and 154*c* may access the SDSP 130 directly or through PSU network 206.

The USS 104 serves to support the UAS operation under the UAS traffic control (UTM) system.

Figure 2:
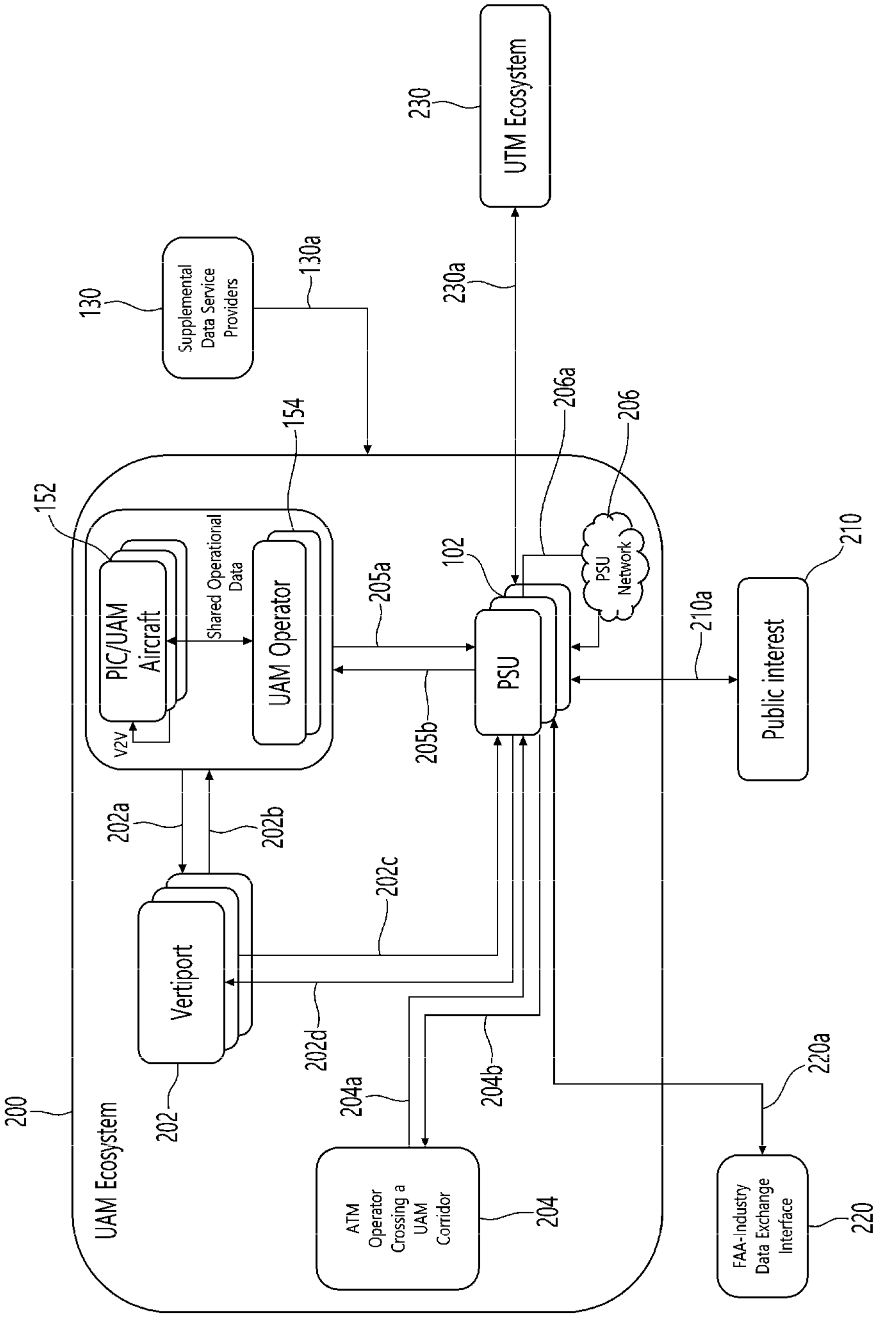
FIG. 2 is a diagram for describing an ecosystem of the UAM according to the embodiment of the present disclosure.

FIG. 2 is a diagram for describing an ecosystem of the UAM according to the embodiment of the present disclosure.

Referring to FIG. 2, the PIC/UAM aerial vehicle 152 and the UAM operator 154 transmit UAM operational intent information and UAM real-time data to a vertiport management system 202 (202*a*), and the vertiport management system 202 transmits vertiport capacity information and vertiport status information to the PIC/UAM aerial vehicle 152 and the UAM operator 154 (202*b*).

In addition, the PIC/UAM aerial vehicle 152 and the UAM operator 154 transmit a UAM operational intent request message, UAM real-time data, and UAM operation departure phase status information to the PSU 102 (205*a*).

The PSU 102 transmits UAM notifications, UAM corridor information, vertiport status information, vertiport acceptance information, and UAM operation intent response message to the PIC/UAM aerial vehicle 152 and the UAM operator 154 (205*b*). In this case, the UAM operational intent response message includes a response message informing of approval/deny, etc., for the UAM operational intent request.

The vertiport management system 202 transmits the UAM operation departure phase status information, the vertiport status information, and the vertiport acceptance information to the PSU 102 (202*c*). The PSU 102 transmits the UAM operational intent information and UAM real-time data to the vertiport management system 202 (202*d*).

In FIG. 2, when aerial vehicles (that is, non-UAMs) other than the UAM aerial vehicles need to cross the UAM flight corridor, the ATM operator 204 crossing the UAM flight corridor transmits a UAM flight corridor crossing request message to the PSU 102 (204*a*), and the PSU 102 transmits a response message to the UAM flight corridor crossing request message (204*b*).

In addition, in FIG. 2, the PSU 102 may perform a procedure for synchronizing UAM data with PSUs connected through the PSU network 206.

In particular, the PSU 102 may exchange information with other PSUs through the PSU network 206 to enable UAM passengers and UAM operators to smoothly provide UAM services (e.g., exchange of flight plan information, notification of UAM flight corridor status, etc.).

In addition, the PSU 102 may prevent risks such as collisions with the UAM aerial vehicle and the unmanned aerial vehicle, and transmit and receive UAM off-nominal operational information and UTM off-nominal operational information to and from the UTM ecosystem 230 for smooth control in real time (230*a*).

In addition, the PSU 102 shares FAA and UAM flight corridor availability, UAM flight corridor definition information, NAS data, a UAM information request, and response to the UAM information request, UAM flight corridor status information, and UAM off-nominal operational information through the FAA industrial data exchange interface 220 (220*a*).

In addition, the PSU 102 may transmit and receive the UAM information request and the response to the UAM information request to and from a public interest agency system 210. The public interest agency system 210 may be an organization defined by a management process (e.g., FAA, CBR) to have access to the UAM operation information. This access may support activities that include public right to know, government regulation, government guaranteed safety and security, and public safety. Examples of public interest stakeholders include regional law enforcement agencies and United States federal government agencies.

In addition, the UAM ecosystem 200 may receive supplemental data such as terrain information, weather information, and obstacles from supplemental data service providers (SDSP) 130 (130*a*), and thus, generate information necessary for safe operation of the UAM aerial vehicle.

In an embodiment of the present disclosure, the PSU 102 may confirm a corresponding UAM flight corridor use status through UAM flight corridor use status (e.g., active, inactive) information. For example, when the UAM flight corridor use status information is set to "active," the PSU 102 may identify whether the UAM flight is scheduled or whether the UAM aerial vehicle is currently flying in the corresponding flight corridor, and when the UAM flight corridor use status information is set to "inactive", the PSU 102 may identify that there is no UAM aerial vehicle currently flying in the corresponding flight corridor.

In addition, the PSU 102 may store operation data related to the flight of the UAM aerial vehicle in an internal database in order to identify a cause of an accident of the UAM aerial vehicle in the future.

These key functions allow the PSU 102 to provide the FAA with cooperative management of the UAM operation without being directly involved in UAM flight.

The PSU 102 may perform operations related to flight planning, flight plan sharing, strategic and tactical conflict resolution, an airspace management function, and an off-nominal operation.

Figure 3:
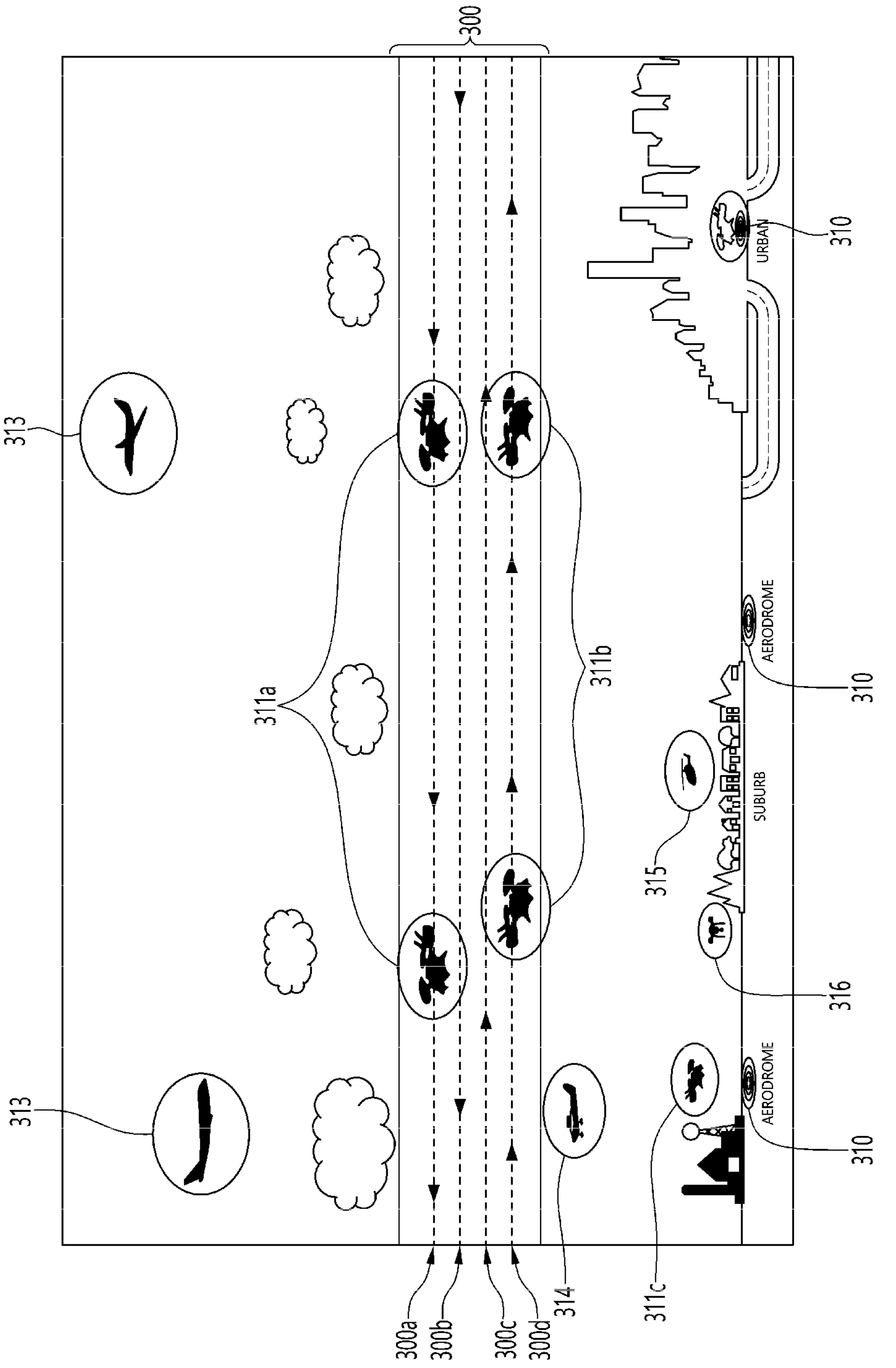
FIG. 3 is a diagram for describing locations of tracks and aerodromes flying by a UAM aerial vehicle in a flight corridor of the UAM according to the embodiment of the present disclosure.
Figure 4:
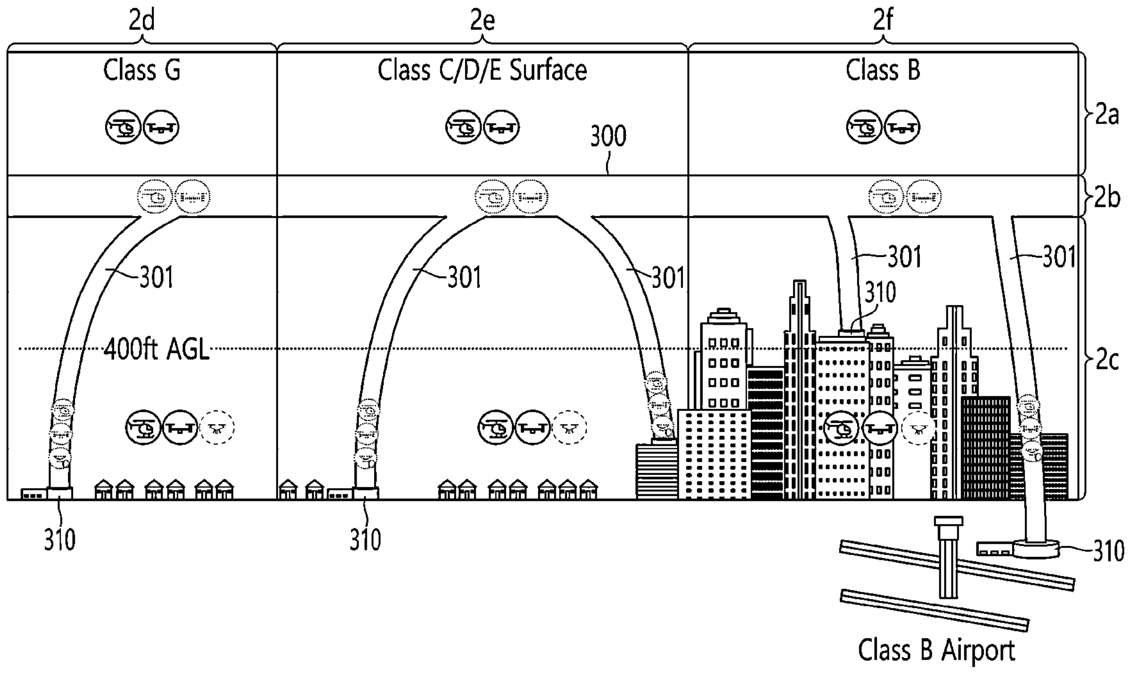
FIGS. 4 and 5 are diagrams illustrating the UAM flight corridor according to the embodiment of the present disclosure.
Figure 5:
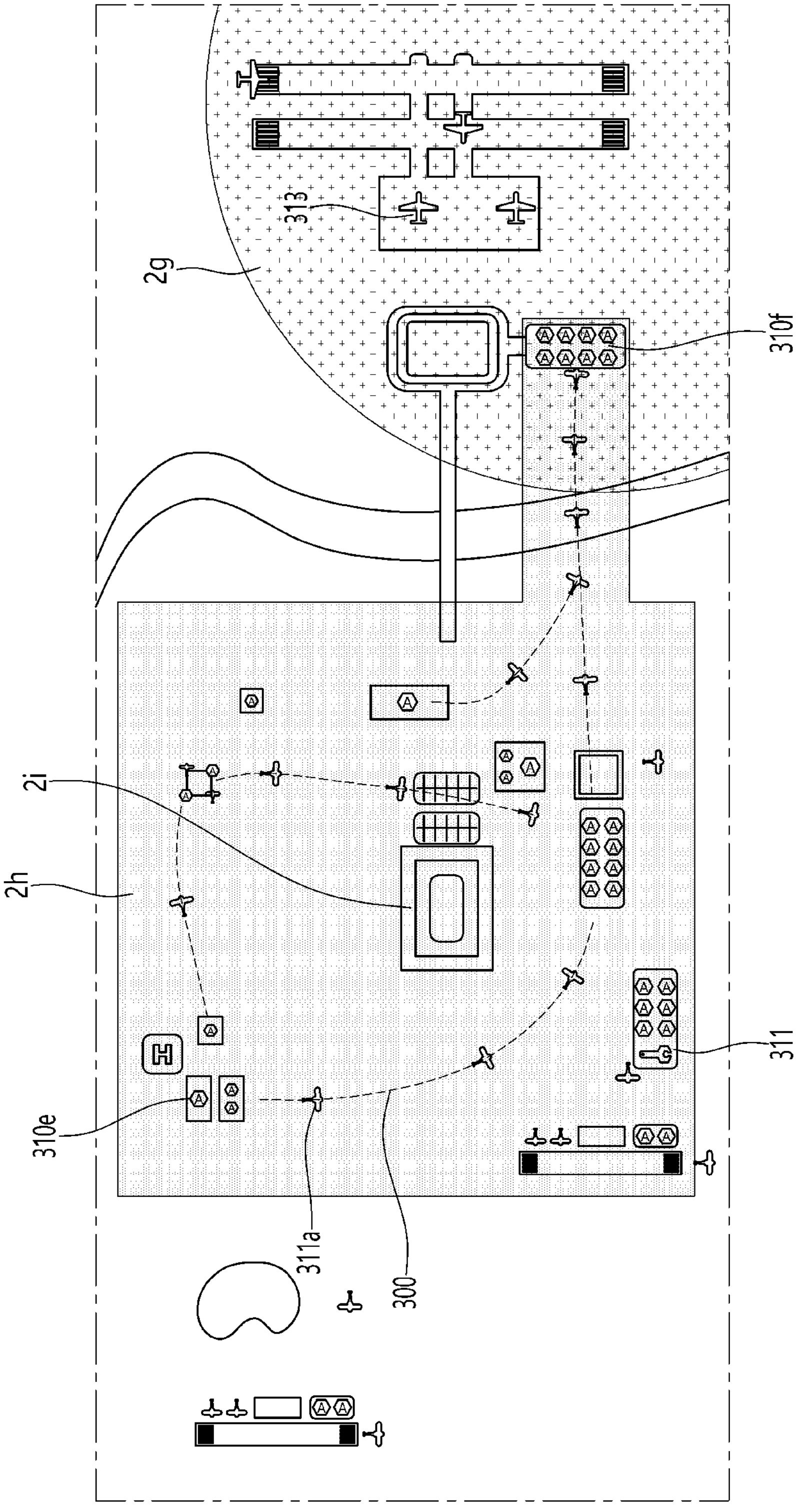

FIG. 3 is a diagram for describing locations of tracks and aerodromes on which UAMs fly within a UAM flight corridor according to an embodiment of the present disclosure, and FIGS. 4 and 5 are diagrams illustrating the UAM flight corridor according to the embodiment of the present disclosure.

It will be described with reference to FIGS. 3 to 5 below.

Referring to FIG. 3, for efficient and safe flight of UAM aerial vehicles 311*a* and 311*b* within a UAM flight corridor 300 according to an embodiment of the present disclosure, a plurality of tracks 300*a*, 300*b*, 300*c*, and 300*d* are provided within the corresponding flight corridor. Each of the tracks 300*a*, 300*b*, 300*c*, and 300*d* has different altitudes to prevent a collision between the UAM aerial vehicles 311*a* and 311*b*, and the number of tracks will be differently set depending on the capacity of the corresponding flight corridor 300.

A UAM aerodrome 310 is an aerodrome that meets capability requirements to support UAM departure and arrival operations. The UAM aerodrome 310 provides current and future resource availability information for UAM operations (e.g., open/closed, pad availability) to support UAM operator planning and PSU strategic conflict resolution. The UAM operator 154 may directly use the UAM aerodrome 310 through the PSU network 206 or through the SDSP 130.

In FIG. 3, the UAM flight corridor 300 should be set to enable the safe and efficient UAM operation without a tactical ATC separation service. Therefore, the UAM flight corridor 300 should be set in relation to the capabilities (e.g., aerial vehicle performance, UAM flight corridor structure, and UAM procedure) of the UAM operator 154.

Additionally, the PSU 102 or the UAM operator 154 may be operated differently within the UAM flight corridor 300 according to operation performance (e.g., aircraft performance envelope, navigation, detection-and-avoidance (DAA)) and participation conditions (e.g., flight intention sharing, conflict resolution within the UAM corridor) of the UAM flight corridor 300.

In addition, the PSU 102 or the UAM operator 154 may set performance and participation requirements of the UAM flight corridor 300 differently between the UAM corridors.

Specifically, the PSU 102 or the UAM operator 154 may variably set the range (flight altitude range) of the UAM flight corridor 300 in consideration of information such as the number of UAM aerial vehicles using the corresponding UAM flight corridor 300, an occupancy request of managements systems (e.g., UTM, ATM) for other aerial vehicles for the corresponding airspace, a no-fly zone, and a flight limit altitude.

In addition, the PSU 102 or the UAM operator 154 may share, as the status information for the set UAM flight corridor 300, the UAM flight information (flight time, flight altitude, track ID within the flight corridor, etc.) within the UAM flight corridor with other UAM operators and/or PSUs through the PSU network 206.

Also, the PSU 102 or the UAM operator 154 may set the number of tracks 300*a*, 300*b*, 300*c*, and 300*d* in the flight corridor according to the range of the UAM flight corridor 300. It is preferable that the corresponding tracks 300*a*, 300*b*, 300*c*, and 300*d* are defined to have a safe guard set so that the PIC/UAM aerial vehicle 152 flying along the corresponding tracks does not collide with each other. Here, the safe guard may be set according to the height of the UAM aerial vehicle, or even when the UAM aerial vehicle temporarily deviates from a track assigned thereto due to a bird strike or other reasons, the safe guard may be a space set so as not to collide with other UAM aerial vehicles flying on the nearest neighbor track above and below the corresponding track.

In addition, the PSU 102 or the UAM operator 154 may set the tracks 300*a*, 300*b*, 300*c*, and 300*d* within the flight corridor according to the range of the UAM flight corridor 300, assign a track identifier (Track ID), which is an identifier in the flight corridor 300 for distinguishing the set tracks, and notify the PIC/UAM aerial vehicle 152 scheduled to fly within the corresponding UAM flight corridor 300 of the assigned track ID.

As a result, the PSU 102 or the UAM operator 154 may monitor in real time whether the PIC/UAM aerial vehicle 152 flying in the corresponding flight corridor 300 are flying along each assigned track ID, and when the PIC/UAM aerial vehicle 152 deviate from the assigned track ID, the PSU 102 or the UAM operator 154 may transmit a warning message to the corresponding PIC/UAM aerial vehicle 152, or remotely control the corresponding PIC/UAM aerial vehicle 152.

In the operating environment of the National Airspace System (NAS), the operation type, regulations and procedures of the airspace may be defined to enable the operation of the aerial vehicle, so the airspace according to the operating environment of the UAM, UTM, and air traffic management (ATM) may be defined as follows.

A UAM aerial vehicle 311 may be operated in the flight corridor 300 set above the area in which the UAM aerodromes 310 are located. In this case, the UAM aerial vehicle 311 may be operated in the above-described operable area based on the performance predefined in designing the airframe.

The unmanned aerial system traffic management (UTM) supports the safe operation of the unmanned aerial system (UAS) in an uncontrolled airspace (class G) below 400 ft (120 m) above ground level (AGL) and controlled airspaces (class B, C, D and, E).

On the other hand, the air traffic management (ATM) may be applied in the whole airspace.

In order to operate the UAM aerial vehicle 311, a fixed-wing aircraft 313, and helicopters 315 inside and outside the UAM flight corridor 300 according to the embodiment of the present disclosure, all aircrafts within the UAM flight corridor 300 operate under the regulations, procedures and performance requirements of the UAM. The case of the fixed-wing aircraft 313 and the aircraft controlled by the UTM may cross the UAM flight corridor 300.

In addition, it is preferable that the helicopter 315 and the UAM aerial vehicle 311 are operated in the UAM flight corridor 300, and outside the UAM flight corridor 300, in the outside of the UAM flight corridor 300, the helicopter 315 and the UAM aerial vehicle 311 comply with the operation form, the airspace class, and the flight altitude according to the regulations for the air traffic management (ATM) and the regulations for the UTM.

Of course, the same regulations as described above are applied to visual flight rules (VFR) 314 or unmanned drones 316 in which a pilot recognizes surrounding obstacles with his eyes and flies in a state in which a surrounding visual distance is wide.

The operation of each aerial vehicle described above does not depend on the airspace class, and may be applied based on the inside and outside of the flight corridor 300 of the UAM. Meanwhile, the airspace class may be classified according to purpose such as a controlled airspace, an uncontrolled airspace, a governed airspace, and an attention airspace, or classified according to provision of air traffic service.

The UAM flight corridor 300 allows the UAM aerial vehicle to be operated more safely and effectively without the technical separation control service (management of interference with other aerial vehicles for safety) according to the ATM. In addition, it is possible to help accelerate the operating tempo related to the operating capability, structure, and procedures of the UAM aerial vehicle. In addition, in the present disclosure, by defining the UAM flight corridor 300, it is possible to provide a clearer solution to agencies having an interest in the related field.

The UAM flight corridor 300 may be designed to minimize the impact on the existing ATM and UTM operations, and should be designed to not only consider the regional environment, noise, safety, and security, but also satisfy the needs of customers.

In addition, the effectiveness of the UAM flight corridor 300 should be consistent with the operation design (e.g., changing the flight direction during take-off and landing at a nearby airport or setting direct priority between opposing aircraft) of the ATM. Of course, the UAM flight corridor 300 may be designed to connect the locations of the UAM aerodromes 310 located at two different points for point-to-point connection.

The UAM aerial vehicle 311 may fly along a take-off and landing passage 301 connecting the flight corridor 300 in the aerodrome 310 to enter the UAM flight corridor 300, and the take-off and landing passage 301 may also be designed in a way that minimizes the impact on ATM and UTM operations and should be designed in a way that satisfies the requirements of customers as well as considering the regional environment, noise, safety, security, etc.

The airspace or operation separation within the UAM flight corridor 300 may be clarified through a variety of strategies and technologies. As a preferred embodiment for the airspace or operation separation within the UAM flight corridor 300, a collision may be strategically prevented based on a common flight area, and an area may be technically assigned to the UAM operator 154. In this case, in an embodiment of the present disclosure, PIC and aircraft performance or the like may be considered when separating the airspace or operation within the UAM flight corridor 300.

In addition, since the UAM operator 154 is responsible for safely conducting the UAM operation in association with aircraft, weather, terrain and hazards, it is also possible to separate the UAM flight corridor 300 through the shared flight intention/flight plan, awareness, strategic anti-collision, and establishment of procedural rules.

For example, it can be seen that the UAM flight corridor 300 in FIG. 3 is separated into two airspaces based on the flight direction of the UAM aerial vehicle 311*a* and 311*b*. In this case, in FIG. 3, in a relatively high airspace within the UAM flight corridor 300, the UAM aerial vehicle 311*a* may fly in one direction (from right to left), and in a relatively low airspace, the UAM aerial vehicle 311*b* may fly in a direction (from left to right) opposite to the one direction.

Meanwhile, the UAS service provider (USS) 104 and the SDSP 130 may provide the UAM operator 154 with weather, terrain, and obstacle information data for the UAM operation. The UAM operator 154 may acquire the data at the flight planning stage to ensure updated strategic management during the UAM operation and flight, and the UAM operator 154 may continuously monitor the weather during the flight based on the data to make a plan or take technical measures to prevent emergencies such as collisions from occurring within the flight corridor.

Accordingly, the UAM operator 154 is responsible for identifying operation conditions or flight hazards that may affect the operation of the UAM, and this information should be collected during flight as well as pre-flight to ensure safe flight.

The PSU 102 may provide other air traffic information scheduled for cross operation within the UAM flight corridor 300, meteorological information such as meteorological wind speed and direction, information on hazards during low altitude flight, information on special airspace status (airspace prohibited areas, etc.), the availability for the UAM flight corridor 300, etc.

In addition, during the UAM operation, the identification information and location information of the UAM aerial vehicle 311 may be acquired through a connected network between the UAM operator 154 and the PSU 102, but is not preferably provided by automatic dependent surveillance-broadcast (ADS-B) or transponder.

Since the operation of UAM ultimately aims at the unmanned autonomous flight, the identification information and location information of the UAM aerial vehicle 311 are acquired or stored by the UAM operator 154 and the PSU 102, and are preferably used for the operation of the UAM.

Meanwhile, referring to FIG. 4, due to the characteristics of UAM that is operated to suit urban and suburban environments, the aerodrome 310 may be installed in several densely populated regions, and each aerodrome 310 may set a take-off and landing passage 301 connected to the UAM flight corridor 300.

The airspace according to the embodiment of the present disclosure may be divided into an airspace 2*a* of an area in which the fixed-wing aircraft 313 and rotary-wing aircraft 315, etc., are allowed to fly only according to the instrument flight Rules (IFR) vertically depending on altitude, an airspace 2*b* in which the UAM flight corridor 300 is formed and airspace 2*c* in which the take-off and landing passage 301 of the UAM aerial vehicle is formed.

The aerial vehicle illustrated in FIG. 4 may be divided into a UAM aerial vehicle (dotted line) flying in the UAM flight corridor 300, an aerial vehicle (solid line) flying in the airspace according to the operating environment of the air traffic management (ATM), and an aerial vehicle (unmanned aircraft system) (UAS) (dashed line) flying at low altitude operated by the unmanned aircraft system traffic management (UTM) operator.

The airspace according to the embodiment of the present disclosure may be horizontally divided into a plurality of airspaces 2*d*, 2*e*, and 2*f* according to the above-described airspace class.

Also, referring to FIG. 5, the airspace may be divided into an airspace 2*g* divided into an existing air traffic control (ATC) area and an area 2*h* where UAM operation or control is performed according to the operation or control area. Of course, the ATC control area 2*g* and the UAM operation or control area 2*h* may overlap depending on circumstances.

In the area 2*h* where the UAM operation or control is performed, a plurality of aerodromes 310*e* and 310*f* may exist for the point-to-point flight of the UAM aerial vehicle 311, and a no-fly zone 2*i* may be set in the area 2*h* where the UAM operation or control is performed.

The UAM flight corridor 300 for the point-to-point flight may be set within the area 2*h* where the UAM operation or control is performed, except for the area set as the no-fly zone 2*i*.

Figure 6:
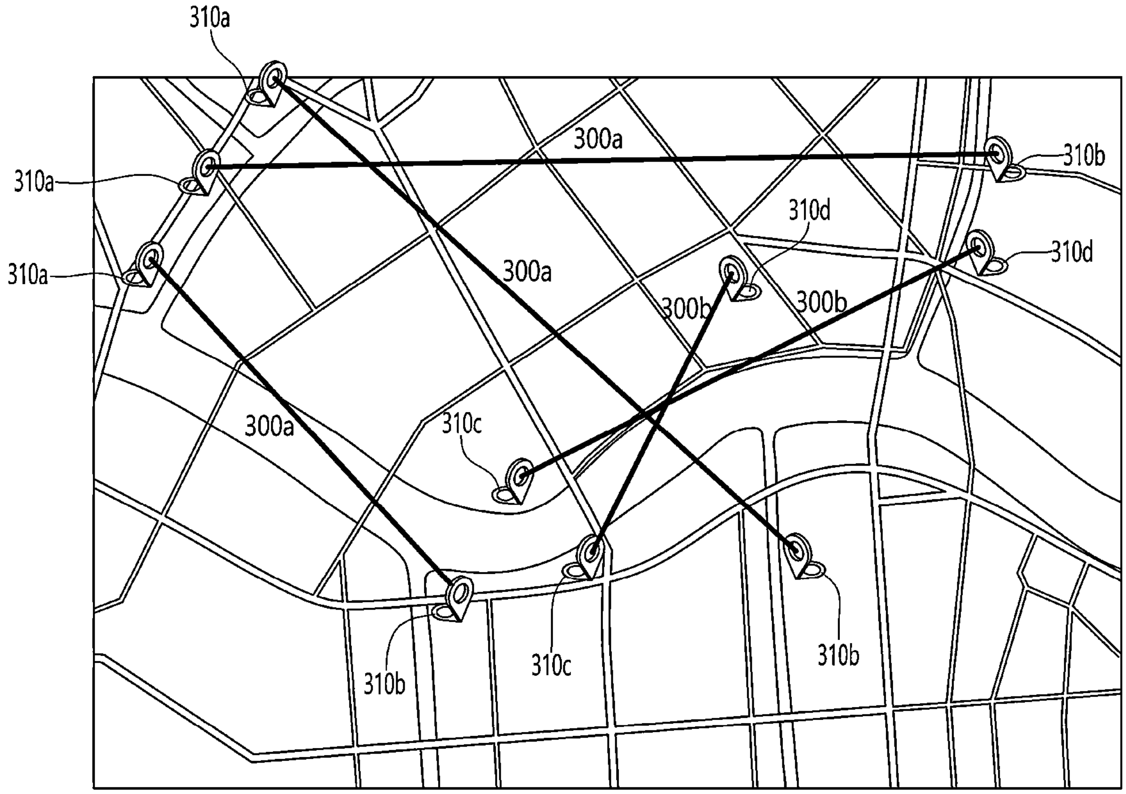
FIG. 6 is a diagram illustrating the flight corridor of UAM for a point to point connection according to an embodiment of the present disclosure.

FIG. 6 is a diagram illustrating the aviation corridor of UAM for the point to point connection according to an embodiment of the present disclosure.

This will be described with reference to FIG. 6 below.

The flight corridors 300*a* and 300*b* of the UAM aerial vehicle may connect an aerodrome 310*a* in one region and an aerodrome 310*b* in another region. The connection between these points may be established within an area excluding special airspace such as the no-fly zone 2*i* within the area 2*h* where the above-described UAM operation or control is performed, and the altitude at which the UAM flight corridor 300 is set may be set within the airspace 2*b* in which the UAM flight corridor 300 is set. Here, the aerodrome 310 may refer to, for example, a vertiport in which an aerial vehicle capable of vertical take-off and landing may take-off and land.

Hereinafter, the operation of the above-described UAM will be described.

The UAM may be operated in consideration with the operation within the UAM flight corridor 300, the strategic airspace separation, the real-time information exchange between the UAM operator 154 and the UAM aerial vehicle 311, the performance conditions of the UAM airframe, etc.

The flight of the UAM may be generally divided into a stage of planning a flight in a pre-flight stage, a take-off stage in which the UAM takes off from the aerodrome 310 and enters a vertical take-off and landing passage 51 and climbs, a climb stage in which the UAM climbs from the aerodrome 310 and enters the flight corridor 300, a cruise stage in which the UAM moves along the flight corridor 300, a descend and landing stage in which the UAM enters the take-off and landing passage 51 from the flight corridor 300, and then, descends and enters the aerodrome 310, a disembarking stage after flight, and operation inspection stage.

The operation in each stage may be performed by being divided into the UAM operator 154, the PSU 102 (or SDSP 130), the FAA, the aerodrome operator, and the PIC/UAM passenger. The PIC/UAM passenger may be understood as a concept including both a person who boards the airframe and controls the airframe and passengers who move through the airframe.

In the pre-flight planning stage, the UAM operator 154 may submit the flight plan to the FAA and confirm the passenger list and destination.

The PSU 102 may remove factors that may hinder flight or plan a strategy for the case where an off-nominal situation occurs.

The FAA may review the flight plan submitted by the UAM operator 154 to determine whether to approve the operational plan, and transmit the determination back to the UAM operator 154.

The aerodrome operator may inspect passengers and cargo, perform boarding of passengers, confirm whether the area around the aerodrome 310 is cleared for departure, and notify the UAM operator 154 and/or the PSU 102 of the information on the confirmed result.

The PIC/UAM passenger may finally confirm all hardware and software systems of the UAM aerial vehicle 311 for departure, and notify the UAM operator 154 and/or the PSU 102 through a communication device.

After the FAA notifies the approval of the UAM operation plan, it maintains the authority for the airspace in which the flight route is established in the PIC/UAM flight, but the UAM operators 154 who actually operate the UAM aerial vehicle and/or the PSU 102 directly control/govern the UAM flight operation, so it is preferable that the FAA does not actively participate in the UAM flight.

In addition, in the take-off stage in which the UAM aerial vehicle takes off the aerodrome 310 and climbs, the UAM operator 154 may approve a taxi request or a take-off request of a runway of an airport of the UAM aerial vehicle and transmit a response message thereto to each UAM.

The PSU 102 may sequentially assign priority to each of the plurality of UAM aerial vehicles to prevent the collision between the UAM aerial vehicles and to smoothly control the aerodrome. The PSU 102 controls and monitors only the UAM aerial vehicle to which priority is assigned to move to the runway or take-off.

Before taking off of the UAM aerial vehicle, the aerodrome operator may confirm the existence of obstacles that hinder the takeoff of the UAM around the aerodrome, and may approve the takeoff of the UAM aerial vehicle if there are no obstacles. The PIC/UAM passenger who has received the take-off approval may proceed with the take-off procedure of the UAM aerial vehicle.

In the climb stage in which the UAM aerial vehicle enters the take-off and landing passage 301 from the aerodrome 310, and then climbs and enters the flight corridor 300 and the cruise stage in which the UAM aerial vehicle moves along the flight corridor 300, the UAM operator 154 monitors whether the PIC/UAM is flying according to the flight plan or whether the overall flight operation plan is being followed. In addition, the UAM operator 154 may monitor the status of the UAM aerial vehicle 311 while exchanging data with the PSU 102 and the UAM aerial vehicle 311 in real time and update information and the like if necessary.

The PSU 102 may also monitor the status of the UAM aerial vehicle 311 while exchanging data with the UAM operator 154 and the UAM aerial vehicle 311 in real time, and may deliver the updated operation plan to the UAM operator 154 and the UAM aerial vehicle 311, if necessary.

When the UAM aerial vehicle 311 enters the cruise stage, the aerodrome operator no longer actively participates in the flight of the UAM aerial vehicle 311. In addition, the PIC/UAM aerial vehicle 311 may execute the take-off and cruise procedures, perform collision avoidance or the like through the V2V data exchange, monitor the system of the aerial vehicle in real time, and provide the UAM operator 154 and the PSU 102 with the information such as the aircraft status.

In the descending and landing stage, since the UAM aerial vehicles 152 and 311 have reached near a destination, the cruise mode is terminated and descends and enters the aerodrome 310 after entering the take-off and landing passage 301 from the flight corridor 300. Even during the descend and landing stage, the UAM operator 154 may continuously monitor the flight status/airframe status of the UAM aerial vehicles 152 and 311 and at the same time, monitor whether the flight of the UAM aerial vehicles 152 and 311 complies with a predefined flight operation plan.

In addition, the UAM aerial vehicles 152 and 311 may be assigned a gate number or gate identification information to land on the aerodrome through communication with the aerodrome operator while entering the take-off and landing passage 301, and confirm whether the current airframe status is ready for landing (landing gear operation, flaps, rotor status, output status, etc.).

The PSU 102 may request the approval of the landing permission of the UAM aerial vehicle 311 from the aerodrome operator, and transmit, to the UAM aerial vehicle 311, information including compliance matters for moving from the current flight corridor or location of the UAM aerial vehicle 311 to the UAM aerodrome 310 permitted to land.

In addition, the UAM aerial vehicle 311 may confirm whether the aerodrome 310 is in a clear status (status in which all elements that may be obstacles to the landing of the UAM aerial vehicle 311 are removed) through communication with the UAM aerodrome 310, the PSU 102, and the UAM operator 154, and after the landing of the UAM aerial vehicle 311 is completed, the UAM aerial vehicle 311, the PSU 102, and the UAM operator 154 may all identify the end of the flight operation of the corresponding UAM aerial vehicle.

When receiving the landing request from the UAM aerial vehicle 311, the aerodrome operator confirms a gate cleared out of the aerodrome. In addition, when the aerodrome operator secures whether the landing is possible for the confirmed gate, the aerodrome operator transmits landing permission message including the gate ID or gate number to the UAM aerial vehicle 311, and assigns a gate corresponding to a landing zone included in the landing permission message to the UAM aerial vehicle 311.

Also, when receiving the landing permission message from the aerodrome operator, the UAM aerial vehicle 311 lands at a gate assigned thereto according to a predetermined landing procedure.

The PIC/UAM passengers may perform the take-off and landing procedure of the UAM aerial vehicle 311, and may perform procedures of preventing collisions with other UAM aerial vehicles while maintaining V2V communication and moving to a runway after landing.

The stage of planning the flight of the UAM aerial vehicle 311 starts with receiving the flight requirements of the UAM aerial vehicle 311 for the UAM operator 154 to fly point to point between the first aerodrome and the second aerodrome. In this case, the UAM operator 154 may receive data (e.g., weather, situation awareness, demand, UAM aerodrome availability, and other data) for the flight of the UAM aerial vehicle 311 from the PSU 102 or SDSP 130.

In all the stages related to the UAM operation, the UAM operator 154 and the PSU 102 not only need to confirm the identification and location information of the UAM aerial vehicle in real time, but also the PIC/UAM and UAM operator 154 needs to monitor the performance/condition of the aerial vehicle in real time to identify whether the flight status of the UAM aerial vehicle 311 is off-nominal.

Meanwhile, the UAM aerial vehicle 311 may have an off-nominal status for various reasons such as weather conditions and airframe failure. The off-nominal status may refer to an operating situation in which the UAM aerial vehicle 311 does not follow a flight plan planned before flight due to various external or internal factors.

Two cases may be assumed as the case in which the off-nominal flight condition occurs in the UAM aerial vehicle 311. The first case is a case where the PIC/UAM aerial vehicle 152 intentionally does not comply with UAM regulations due to any other reason, and the second case is the unintentional non-compliance with the UAM operating procedures due to contingencies.

In the first case, it may be assumed that the case where the UAM aerial vehicle 311 intentionally (or systematically) does not comply with the planned UAM operating regulations is the case where the UAM aerial vehicle 311 does not comply with the planned flight operation due to airframe performance problems, strong winds, navigation failure, etc.

However, in the first case, the PIC/UAM aerial vehicle 152 may be in a state in which it may safely arrive at the planned aerodrome 310 within the flight corridor 300.

When the PSU 102 identifies that the off-nominal operation according to the first case has occurred in the PIC/UAM aerial vehicle 152, the PSU 102 distributes, to each stakeholder (UAM operator 154, USS 104, vertiport operator 202, UTM ecosystem 230, ATM operators 204, etc.) through a wired/wireless network, PIC/UAM aerial vehicle off-nominal event occurrence information (UAM aerial vehicle identifier where an off-nominal event occurred, UAM aerial vehicle locations (flight corridor identifier, track identifier), information (event type) notifying a type of off-nominal situations, etc.) notifying that an off-nominal operation status has occurred in the PIC/UAM aerial vehicle 152.

In addition, the UAM operator 154 and the PSU 102 receiving the PIC/UAM aerial vehicle off-nominal event occurrence information may generate a new UAM operation plan that may satisfy UAM community based rules (CBR) and performance requirements for operation within the flight corridor 300, and distribute the generated new UAM operation plan to stakeholders again.

In the second case, the case where the UAM aerial vehicle 152 unintentionally does not comply with the UAM operation due to an accidental situation may be a state in which the forced landing (crash landing) of the UAM aerial vehicle 152 is required, and may be a severe situation where the planned flight operation may not be performed.

That is, the second case is the case where, since it is difficult for the PIC/UAM aerial vehicle 152 to safely fly to the planned aerodrome 310 within the flight corridor 300 assigned thereto, the PIC/UAM aerial vehicle 152 may not fly within the flight corridor 300 assigned thereto.

When the off-nominal operation according to the second case has occurred, similar to the first case, the PSU 102 distributes, to each stakeholder (UAM operator 154, USS 104, vertiport operator 202, UTM ecosystem 230, ATM operators 204, etc.) through the wired/wireless network, the PIC/UAM aerial vehicle off-nominal event occurrence information (UAM aerial vehicle identifier where an off-nominal event occurred, UAM aerial vehicle locations (flight corridor identifier, track identifier), information (event type) notifying a type of off-nominal situations, etc.) notifying that an off-nominal operation status has occurred in the PIC/UAM aerial vehicle 152.

In addition, the PIC/UAM aerial vehicle 152 is reassigned a new flight corridor 300 for flight to a previously secured landing spot and a track identifier within the flight corridor 300 in preparation for an emergency situation in the UAM aerial vehicle, and at the same time, may fly in a flight mode to avoid collision damage with other aerial vehicles through communication means (ADS-B, etc.).

Hereinafter, an evaluation indicator for the operation of the UAM aerial vehicle according to an embodiment of the present disclosure will be described.

As shown in <Table 1> below, UAM operational evaluation indicators may include major indicators such as operation tempo, UAM structure (airspace and procedures), UAM regulatory changes, UAM community regulations (CBR), aircraft automation level, etc.

TABLE 1

| Indicator Item | Description |
|---|---|
| Operation Tempo | It indicates density of UAM operation, frequency of UAM operation, and complexity of UAM operation. |
| UAM Operation Structure (Airspace and Procedure) | It indicates complex level of infrastructure and services supporting UAM operating environment. |

TABLE 1-continued

| Indicator Item | Description |
|---|---|
| UAM Operation Regulation | It indicates level of evolution of current regulations required for UAM operation structure and performance. |
| UAM Community Laws and Regulations | It indicates rules supplementing UAM operation regulations for UAM operation and expansion of PSU. |
| Aircraft Automation Level | It may be divided into HWTL (Human-Within-The-Loop), HOTL (Human-On-The-Loop), HOVTL (Human-Over-The-Loop).<br>1) HWTL: Stage where person directly controls UAM system<br>2) HOTL: Stage of system that is controlled under human supervision, i.e., stage in which human actively monitors<br>3) HOVTL: Stage in which human performs monitoring passively |

Figure 7:
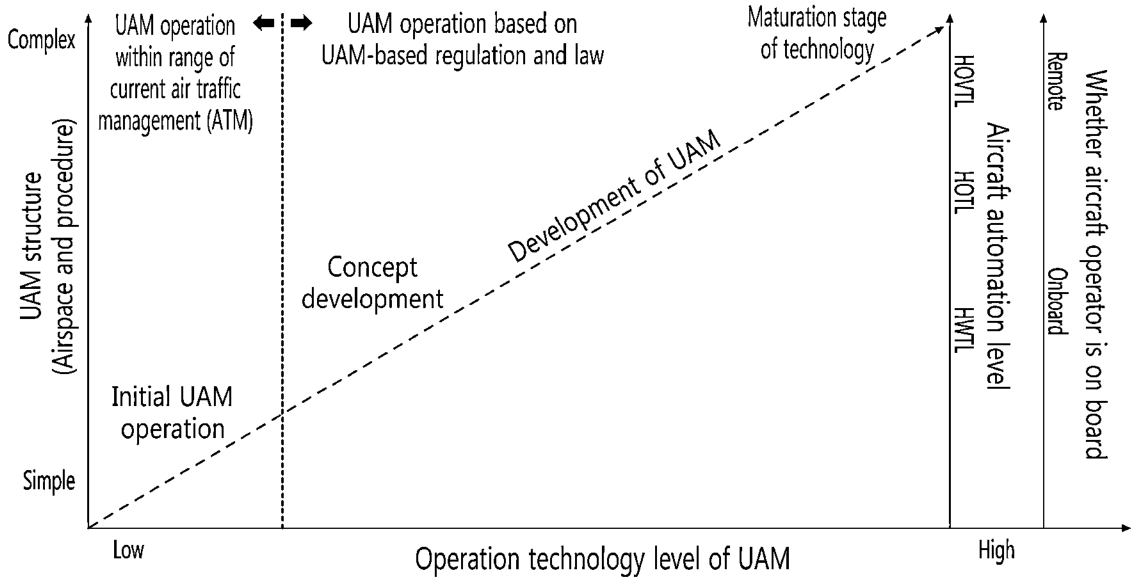
FIG. 7 is a diagram illustrating a development stage of the UAM.

FIG. 7 is a diagram illustrating a development stage of an operating technology level of the UAM.

Hereinafter, concepts of an initial UAM operation stage, a transitional UAM operation stage, and a final UAM operation stage will be described with reference to the above-described key indicators and FIG. 7.

First, in the initial UAM operation stage, the structure of the UAM aerial vehicle is likely to use various existing vertical take-off and landing (VTOL) rotary-wing aircraft infrastructures.

The UAM's regulatory changes may be gradually implemented while complying with aviation regulations and the like under current laws and regulations. However, the UAM community rules (CBR) may not be separately defined.

The aircraft automation level borrows manned rotary-wing technology, which is currently widely used as of the time this specification is written, but an on-board status may be applied to the pilot in command (PIC) stage.

Next, looking at the transitional UAM operation step, in the UAM structure, the UAM airframe may be operated within a specific airspace based on the performance and requirements of the UAM aerial vehicle.

As for UAM regulations, the ATM regulations may be changed and applied, new regulations for UAM that can be operated may be defined, and the UAM community regulations may also be defined.

In the transitional UAM operation stage, the automation level of the UAM aerial vehicle may be capable of PIC control with an airframe designed exclusively for the UAM, but the on-board status may still be maintained as the PIC stage.

Finally, looking at the final UAM operation stage, the UAM airframe may be operated in a specific airspace based on the performance and requirements of the UAM aerial vehicle, but several variables may exist.

It is predicted that the UAM regulation changes will require additional regulations to enable various operations within the UAM flight corridor, and as the complexity of the UAM community regulations increases, FAA guidelines are expected to increase.

Due to the development of artificial intelligence (AI) technology and the development of aviation airframe technology, the aircraft automation level will be realized at a higher automation level compared to the UAM aerial vehicle at the existing stage. As a result, it is predicted that it will reach the unmanned horizontal or vertical take-off or landing technology level, and the PIC stage may be a stage where remote control is possible.

Figure 8:
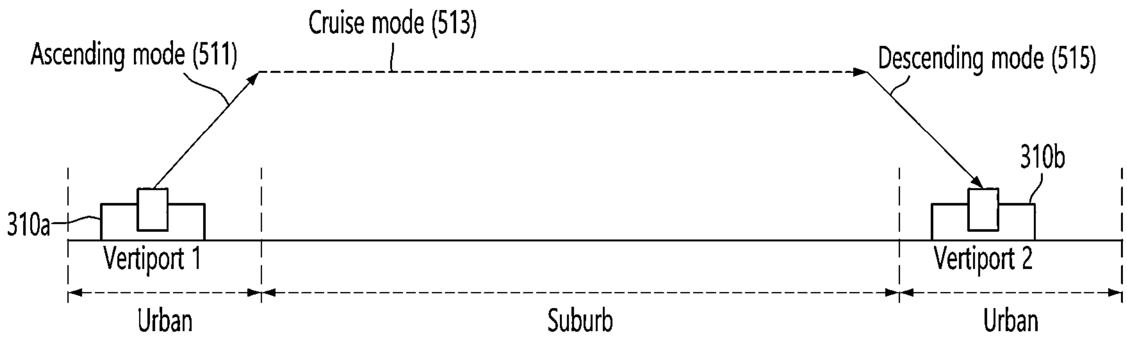
FIG. 8 is a diagram illustrating a flight mode of aerial vehicle according to an exemplary embodiment of the present disclosure.

FIG. 8 is a diagram for describing a flight mode of the UAM aerial vehicle according to an exemplary embodiment of the present disclosure.

Referring to FIG. 8, in an embodiment of the present disclosure, the flight mode of the UAM aerial vehicle may include a take-off mode (not illustrated), an ascending mode 511, a cruise mode 513, a descending mode 515, and a landing mode (not illustrated).

The take-off mode is a mode in which the UAM aerial vehicle takes off from a vertiport 310*a* at the starting point, the ascending mode 511 is a mode in which the UAM aerial vehicle performs a stage of ascending the flight altitude step by step to enter the cruise altitude, the cruise mode 513 is a mode in which the UAM aerial vehicle flies along the cruise altitude, the descending mode 515 is a mode in which the UAM aerial vehicle performs a stage of descending the altitude step by step in order to land from the cruise altitude to the vertiport 310*b* of the destination, and the landing stage is a mode in which the UAM aerial vehicle lands on the vertiport 310*b* of the destination.

In addition, in the take-off mode, the UAM aerial vehicle may perform a taxiing stage to enter the vertiport 310*a* of the departure point, and even after the landing stage, the UAM aerial vehicle may perform the taxiing stage to enter the vertiport 310*b* of the destination.

In another embodiment of the present embodiment, in the case of the vertical take-off and landing (VTOL), a take-off mode and the ascending mode 511 may be performed simultaneously, and a landing mode and descending mode 515 may also be performed simultaneously.

In this embodiment, the UAM aerial vehicle is a type of urban transport air transportation means, and the vertiport 310*a* of the departure point and the vertiport 310*b* of the destination may be located in the urban area, and according to the cruise mode 513, the aviation corridor on which the UAM aerial vehicle flies may be located in the suburban area outside the urban area.

According to the above-described embodiment of the present disclosure, the take-off mode, the ascending mode 511, the descending mode 515, and the landing mode of the UAM aerial vehicle are performed in a densely populated urban area so thrust may be generated through a distributed electric propulsion (DEP) method to suppress the generation of soot and noise caused by an internal combustion engine. On the other hand, in the cruise mode 513 of the UAM aerial vehicle, which is mainly performed in the suburban area, the thrust may be generated by an internal combustion engine (ICE) propulsion method in order to increase an operating range, a payload, a flying time, etc.

Of course, the propulsion method for generating the thrust of the UAM aerial vehicle is not necessarily determined for each flight mode described above, and the thrust of the UAM aerial vehicle may be selected by either the DEP method or the ICE method by additionally considering various factors such as the location, altitude, speed, status, and weight of the UAM aerial vehicle.

The operation of the propulsion system according to the flight area of the UAM aerial vehicle according to the embodiment of the present disclosure illustrated in FIG. 8 is summarized in <Table 2> below.

TABLE 2

| Flight Area | Description of propulsion system operation - control |
|---|---|
| Urban | Generate lift and thrust only with battery, not internal combustion engines, in consideration of low noise and eco-friendliness<br>Flight by selecting propulsion unit that may generate thrust/lift as much as data trained in advance through machine learning (ML) rather than full propulsion system, and generating lift/thrust with only selected propulsion unit |
| Suburb | In suburban area, which is less sensitive to noise and eco-friendliness than in urban area, thrust is generated through all propulsion units to enable full power flight for cruise flight, and power is supplied through battery or internal combustion engine |

In the flight phase including the above-described take-off stage, ascending stage, cruise phase, descending stage, and landing stage, the aerial vehicle may perform flight route guidance by generating 3D space data. Hereinafter, a 3D space data generation method according to an embodiment of the present disclosure and flight route guidance using 3D space data will be described in more detail.

Figure 9:
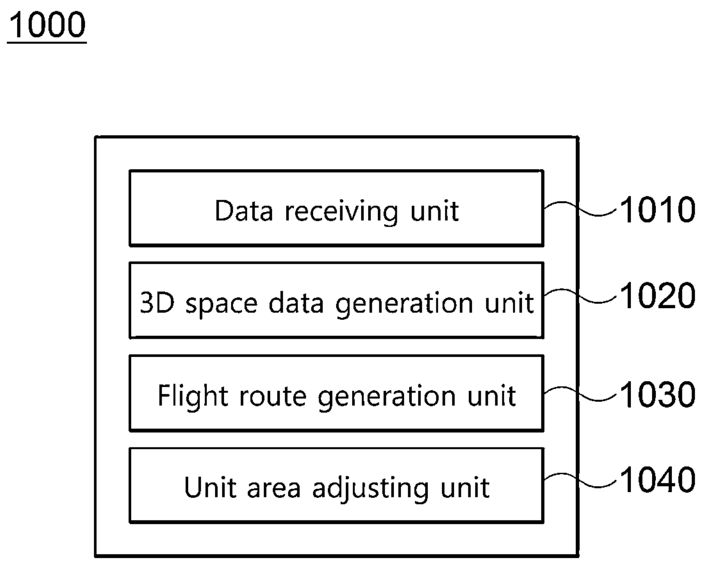
FIG. 9 is a block diagram illustrating a 3D space data generation device according to an embodiment of the present disclosure.

FIG. 9 is a block diagram illustrating a 3D space data generation device according to an embodiment of the present disclosure.

Referring to FIG. 9, a 3D space data generation device 1000 uses part or all of a data receiving unit 1010, a 3D space data generation unit 1020, a flight route generation unit 1030, and a unit area adjusting unit 1040.

The data receiving unit 1010 may receive various data required for the 3D space data generation device 1000.

In detail, the data receiving unit 1010 may receive map data for a 3D space in which an aerial vehicle flies from a supplemental data service provider (SDSP) 130 or the like.

Here, the map data includes data necessary to represent a 3D space, 3D geospatial information (GIS) for 3D space, information (e.g., obstacle location, height, size, shape, type, etc.) on obstacles located in 3D space may be included.

As an example, the map data may be a digital surface model (DSM) which is a model in which all information (e.g., information on terrains, trees, buildings, and artificial structures) of the real world is expressed. Hereinafter, in the present disclosure, the map data will be described based on the case of a numerical expression model.

In addition, the data receiving unit 1010 may receive operational information of an aerial vehicle and other aerial vehicles from the UAM operators 154*a*, 154*b*, and 154*c*, the PSU 102, and the like. Here, the operational information may include locations of a departure point and a destination, current locations, a departure time, an arrival time, and the like.

The 3D space data generation unit 1020 may generate 3D space data corresponding to a region in which an aerial vehicle flies based on the map data received from the data receiving unit 1010.

Specifically, the 3D space data generation unit 1020 may extract representative height values or outliers from the received map data and reconstructs the map data based on the extracted height values or outliers to generate a map in a unit area format.

In addition, the 3D space data generation unit 1020 may generate the 3D space data by dividing the space into a flight area in which an aerial vehicle may fly and a restricted area in which an aerial vehicle may not fly based on the location and height of each unit area in the map data in the unit area format.

Here, the map data in the unit area format represents obstacles in the existing map data as a unit area, the 3D space data may mean that obstacles and terrain are divided into each unit area and expressed, and the unit area is an area of a certain size in a 3D space and may mean a voxel.

That is, the 3D space data generation unit 1020 may generate an actual 3D space as the 3D space data expressed in a voxel terrain format.

This will be described with reference to FIGS. 10A to 10C.

Figure 10A:
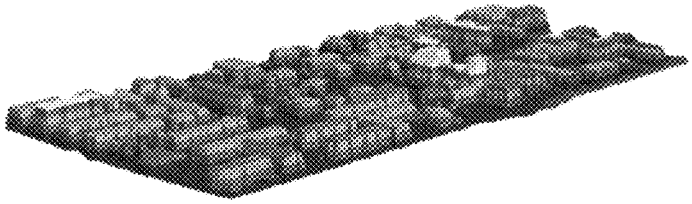
FIGS. 10A to 10C are exemplary diagrams illustrating 3D space data according to an embodiment of the present disclosure.
Figure 10B:
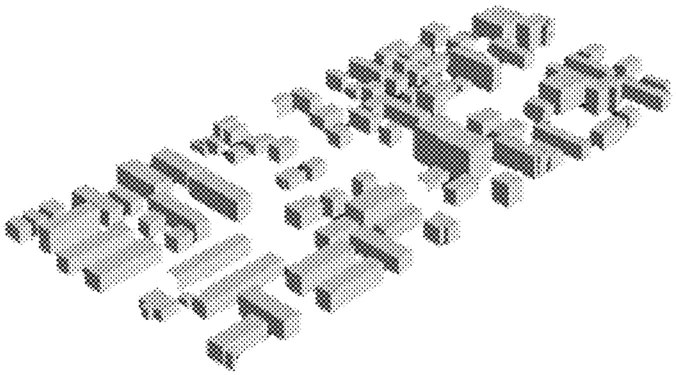
Figure 10C:
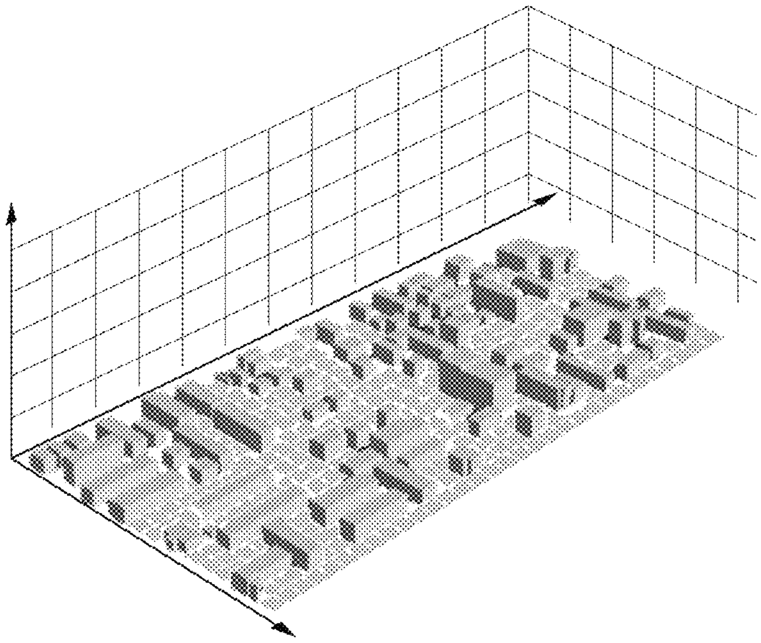

FIGS. 10A to 10C are exemplary diagrams illustrating the 3D space data according to the embodiment of the present disclosure.

Referring to FIGS. 10A to 10C, the 3D space data generation unit 1020 may reconstruct the digital surface model (DSM), which is the model including all information of the real world as illustrated in FIG. 10A, to generate the map data in the unit area format as illustrated in FIG. 10B, and then, generate the 3D space data expressed by dividing obstacles and terrain into each unit area as illustrated in FIG. 10C.

In addition, the 3D space data generation unit 1020 may generate the 3D space data by dividing the space into the flight area in which the aerial vehicle may fly and the restricted area in which the aerial vehicle may not fly based on the map data, and dividing the flight area and the restricted area into each unit area. Here, the restricted area may include an area in which obstacles such as buildings, trees, and other aerial vehicles are located, zones classified as prohibited by law, and the like.

For example, the 3D space data generation unit 1020 may generate the 3D space data by dividing the flight area and the restricted area based on the map data, dividing the flight area into a first unit area, and dividing the restricted area into a second unit area. Here, the 3D space data generation unit 1020 may determine the size of the first unit area in consideration of the size, speed, direction, etc., of the aerial vehicle, and the 3D space data generation unit 1020 may determine the size of the second unit area according to the sizes and shapes of the obstacles and the distance between each obstacle. In this case, the first unit area and the second unit area may have different sizes.

The 3D space data will be described with reference to FIGS. 11A to 11D.

FIGS. 11A to 11D are exemplary diagrams illustrating the 3D space data according to the embodiment of the present disclosure.

Figure 11A:
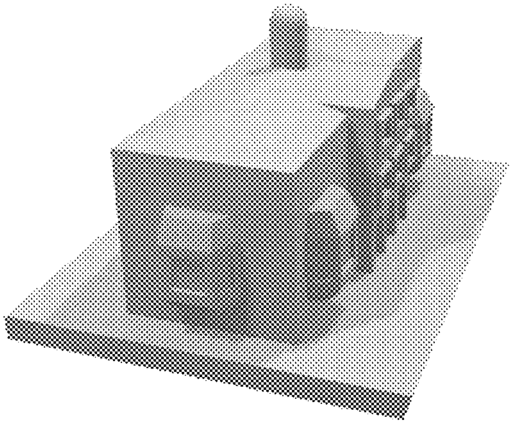
FIGS. 11A to 11D are exemplary diagrams illustrating the 3D space data according to the embodiment of the present disclosure.
Figure 11B:
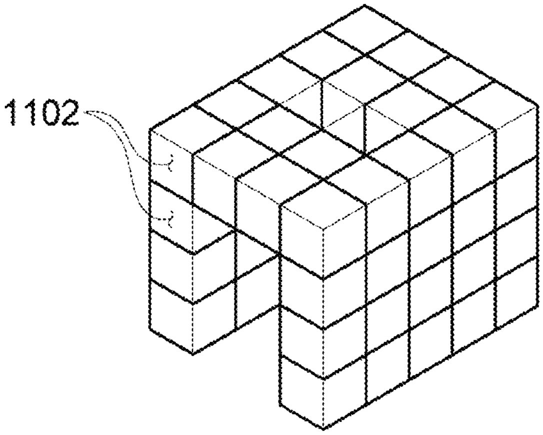
Figure 11C:
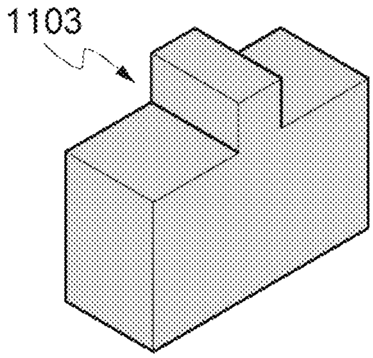
Figure 11D:
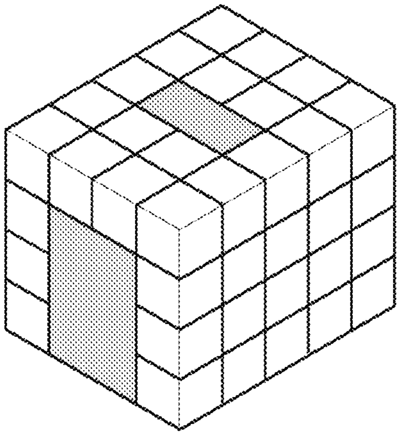

FIG. 11A illustrates map data for a real world 3D space, FIG. 11B illustrates the flight area within the map data as the first unit area, FIG. 11C illustrates the restricted area within the corresponding map data as the second unit area, and FIG. 11D illustrates the 3D space data expressed by dividing the flight area and the restricted area into each unit area.

Referring to FIGS. 11A to 11D, the 3D space data generation unit 1020 may divide the area in which the obstacle 1101 is located in the map data illustrated in FIG. 11A into the restricted area, and divide other areas into the flight area.

The 3D space data generation unit 1020 may generate the 3D space data illustrated in FIG. 11D by dividing the divided flight area illustrated in FIG. 11B into the first unit area 1102, and dividing the restricted area illustrated in FIG. 11C into the second unit area 1103. In this case, the 3D space data generation unit 1020 may divide the restricted area by setting the size of the second unit area to correspond to the size of the obstacle 1101. In this case, the 3D space data generation unit 1020 may divide the restricted area into unit areas greater than the flight area.

That is, the 3D space data generation unit 1020 may divide a restricted area not necessary for an aerial vehicle to fly into one unit area.

Accordingly, the 3D space data generation device 1000 may generate the 3D space data with lower capacity, and reduce the data processing load of the aerial vehicle, the PSU 102, the UAM operator 154, the vertiport management system 202, and the like.

Meanwhile, the 3D space data generation unit 1020 may differently determine the sizes of the unit areas for each restriction area.

Also, the 3D space data generation unit 1020 may divide adjacent restricted areas within a predetermined distance or less into one unit area. Here, the predetermined distance means a minimum distance at which the aerial vehicle may fly between the restricted areas, and for example, the predetermined distance may be equal to the size of the aerial vehicle.

Referring back to FIG. 9, the flight route generation unit 1030 may generate a flight route of an aerial vehicle using the 3D space data and the operational information of the aerial vehicle. Here, the operational information may include the departure point and destination of the aerial vehicle, and the operational information may also include the operational style (route over highway, route over river, preferred altitude, etc.) preferred by the aerial vehicle user.

Specifically, the flight route generation unit 1030 may set a straight flight route in the flight area of the 3D space data based on the operational information, and then, when the restricted area is included on the straight line route, generate the final flight route by modifying the flight route to avoid the corresponding obstacle. In this case, the flight route generation unit 1030 may use a Quadtree or Octree algorithm, and the flight route generation unit 1030 may generate the flight route of the aerial vehicle by connecting the center points of the unit area.

This will be described with reference to FIG. 12.

Figure 12:
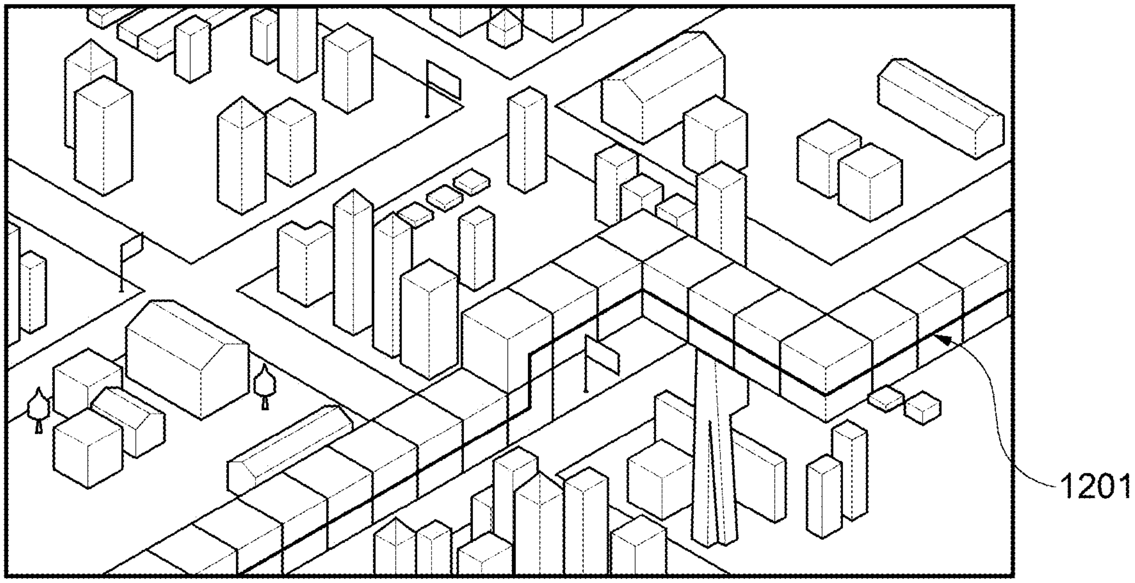
FIG. 12 is an exemplary diagram illustrating a flight path in 3D space data according to an embodiment of the present disclosure.

FIG. 12 is an exemplary diagram illustrating a flight path in 3D space data according to an embodiment of the present disclosure.

FIG. 12 illustrates only a part of unit areas in 3D space data for convenience of description.

Referring to FIG. 12, the flight route generation unit 1030 may determine a flight route 1201 in the flight area of the 3D space data based on the operational information. Here, the flight route 1201 may be a space in which unit areas are connected.

In addition, the flight route generation unit 1030 may modify the generated flight route when the size of the unit area in the 3D space data is adjusted and/or changed.

In addition, the flight route generation unit 1030 may generate a flight route that is not the shortest distance in consideration of a preferred operational style.

In addition, the flight route generation unit 1030 may generate a flight route using only a portion of the 3D space data based on the operational information.

The unit area adjusting unit 1040 may adjust the size of the unit area of the flight area in the 3D space data based on the flight route.

Specifically, when the flight route is adjacent to the restricted area, the unit area adjusting unit 1040 may adjust the size of the unit area by dividing the size of the unit area of the flight area adjacent to the restricted area. In this case, the unit area adjusting unit 1040 may adjust the size of the unit area according to the size of the aerial vehicle. For example, the unit area adjusting unit 1040 may adjust the size of the unit area so as not to be smaller than the size of the aerial vehicle.

This will be described with reference to FIGS. 13A and 13B.

Figure 13A:
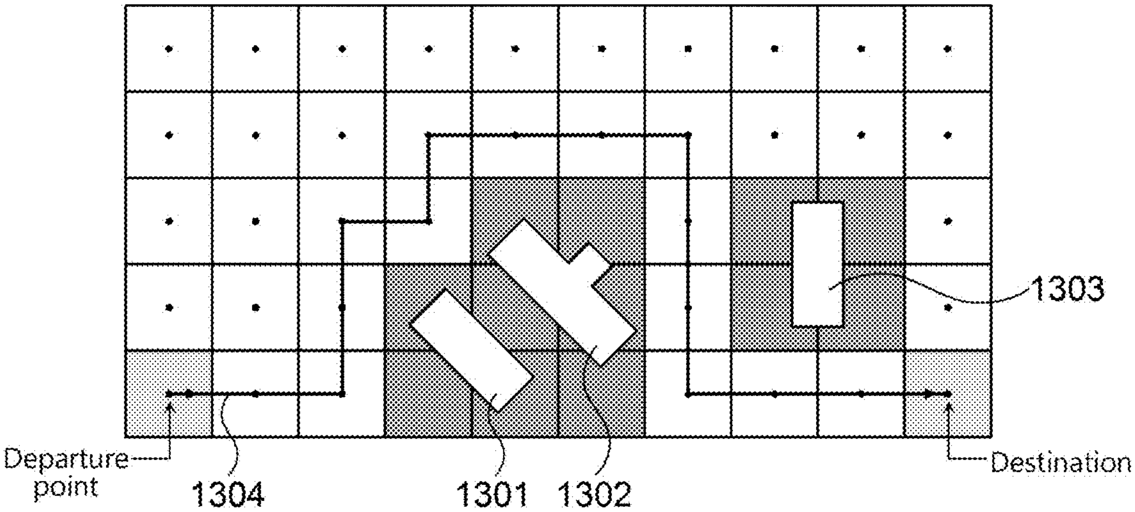
FIGS. 13A and 13B are exemplary diagrams illustrating a method of adjusting a size of a unit area of a flight area according to an embodiment of the present disclosure.
Figure 13B:
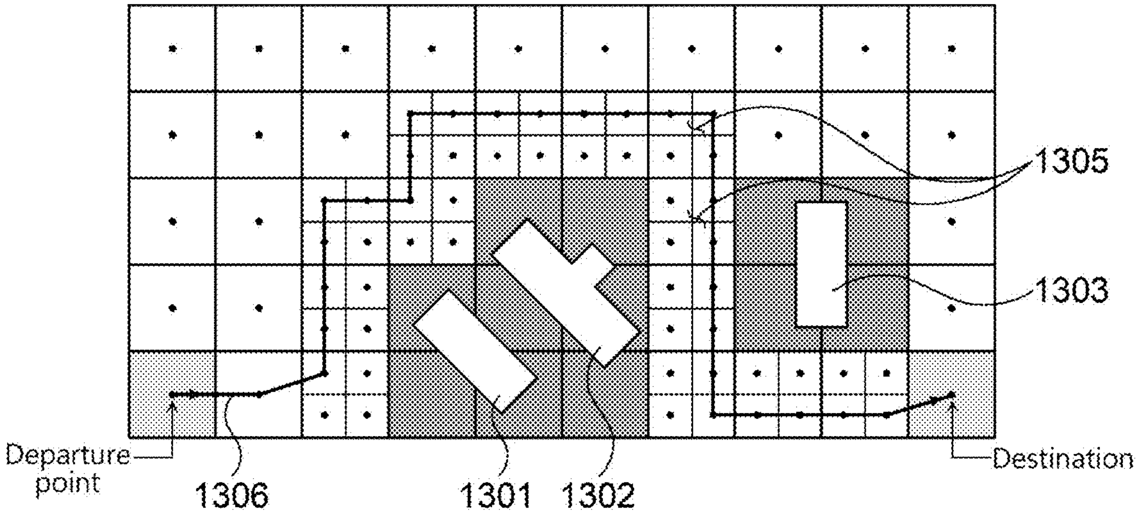

FIGS. 13A and 13B are exemplary diagrams illustrating a method of adjusting a size of a unit area of a flight area according to an embodiment of the present disclosure.

In this example, for convenience of description, the 3D space data is shown in two dimensions from a top view point of view, and the flight route of the aerial vehicle configured only in the vertical direction will be described.

Referring to FIG. 13A, the flight route generation unit 1030 may generate a first flight route 1304 from the departure point to the destination by avoiding the restricted area (colored area) due to obstacles 1301, 1302, and 1303 in the 3D space data.

Referring to FIG. 13B, the unit area adjusting unit 1040 may adjust the size by dividing the size of the unit areas 1305 of the flight area adjacent to the obstacles 1301, 1302, and 1303 into four based on the first flight route 1304.

Next, the flight route generation unit 1030 may generate a second flight route 1306 by modifying the existing first flight route 1304 based on the flight area in which the size of the unit areas is adjusted. Thereafter, the aerial vehicle may fly based on the second flight route 1306.

In addition, the unit area adjusting unit 1040 may adjust the unit area size of the flight area based on a flight speed and a flight direction of the aerial vehicle.

This will be described with reference to FIGS. 14A and 14B.

Figure 14A:
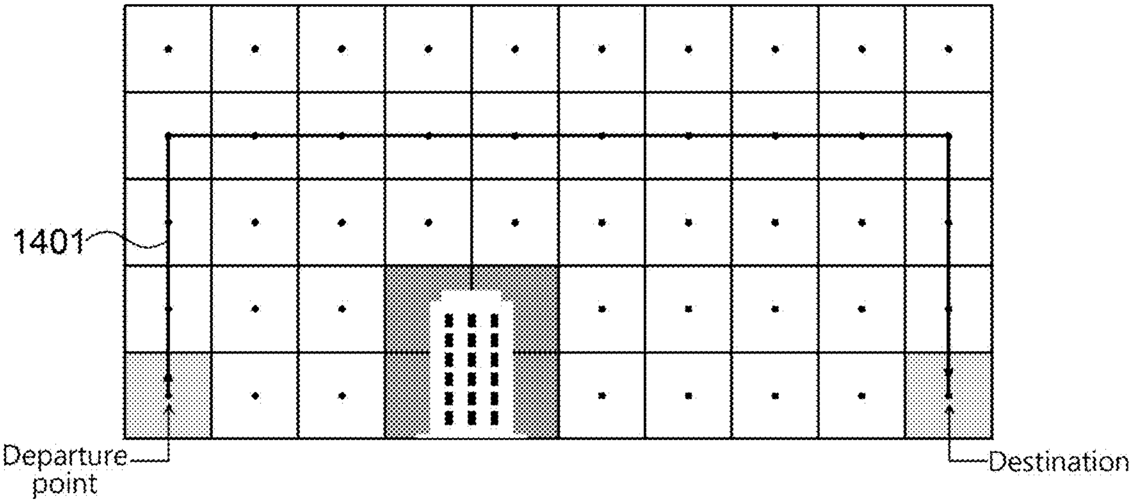
FIGS. 14A and 14B are exemplary diagrams illustrating a method of adjusting a size of a unit area of a flight area according to another embodiment of the present disclosure.
Figure 14B:
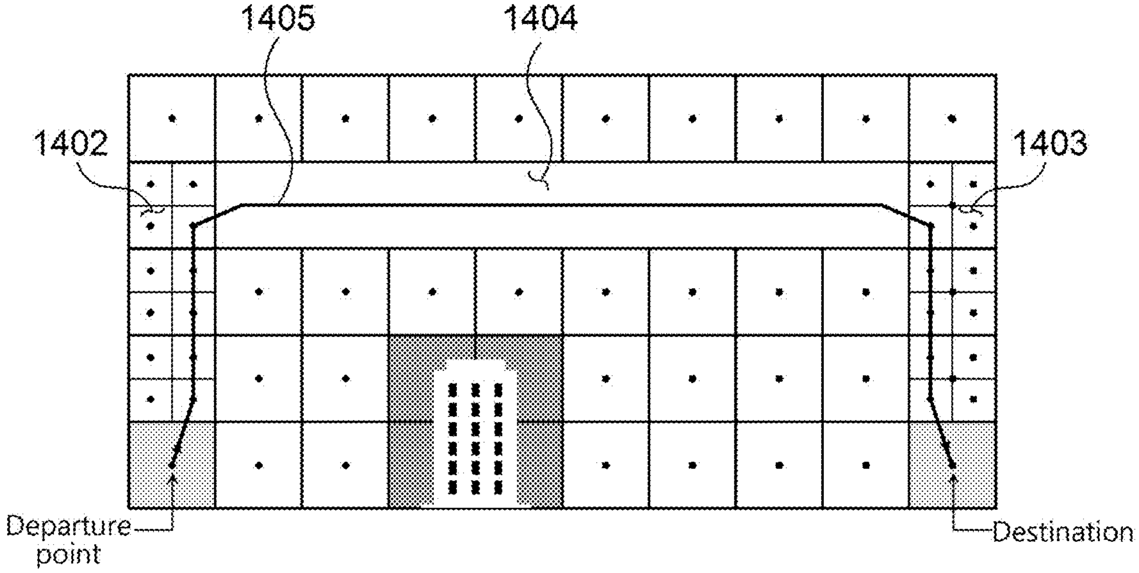

FIGS. 14A and 14B are exemplary diagrams illustrating a method of adjusting a size of a unit area of a flight area according to another embodiment of the present disclosure.

In this example, the 3D space data is shown in two dimensions from a side view point of view for convenience of description.

Referring to FIG. 14A, the flight route generation unit 1030 may generate a first flight route 1401 that increases and then lowers the altitude of the restricted area (colored area) due to obstacles in the 3D space data from the departure point to the destination.

Referring to FIG. 14B, the unit area adjusting unit 1040 may adjust the size by dividing the sizes of the unit areas 1402 and 1403 of the flight area corresponding to the increasing and lowering of the altitude based on the first flight route 1401 into four.

In addition, the unit area adjusting unit 1040 may adjust the size of the unit area so that the unit areas 1404 corresponding to a straight section without obstacles become one.

Next, the flight route generation unit 1030 may generate a second flight route 1405 by modifying the existing first flight route 1401 based on the flight area in which the size of the unit areas is adjusted. Thereafter, the aerial vehicle may fly based on the second flight route 1405.

In addition, the unit area adjusting unit 1040 may adjust the size of the unit area adjacent to another an aerial vehicle when another aerial vehicle approaches a travel route.

In addition, the unit area adjusting unit 1040 may adjust the size of the unit area of the flight area to be flown in a curve during the traveling route.

That is, the unit area adjusting unit 1040 may adjust the size of the unit area of the corresponding flight area to be smaller with respect to a flight area (e.g., an area adjacent to an obstacle) requiring caution, and adjust the size of the unit area of the corresponding flight area to increase with respect to a flight area (for example, an area corresponding to a route that is not adjacent to an obstacle and goes straight) that does not require caution.

Through this, the present disclosure may adjust the size of the unit area of the 3D space data to generate a more accurate flight route.

In addition, the present disclosure may reduce the data processing load by adjusting only the size of the unit area corresponding to the flight route.

Next, the 3D space data generation method of the 3D space data generation device will be described with reference to FIG. 15.

Figure 15:
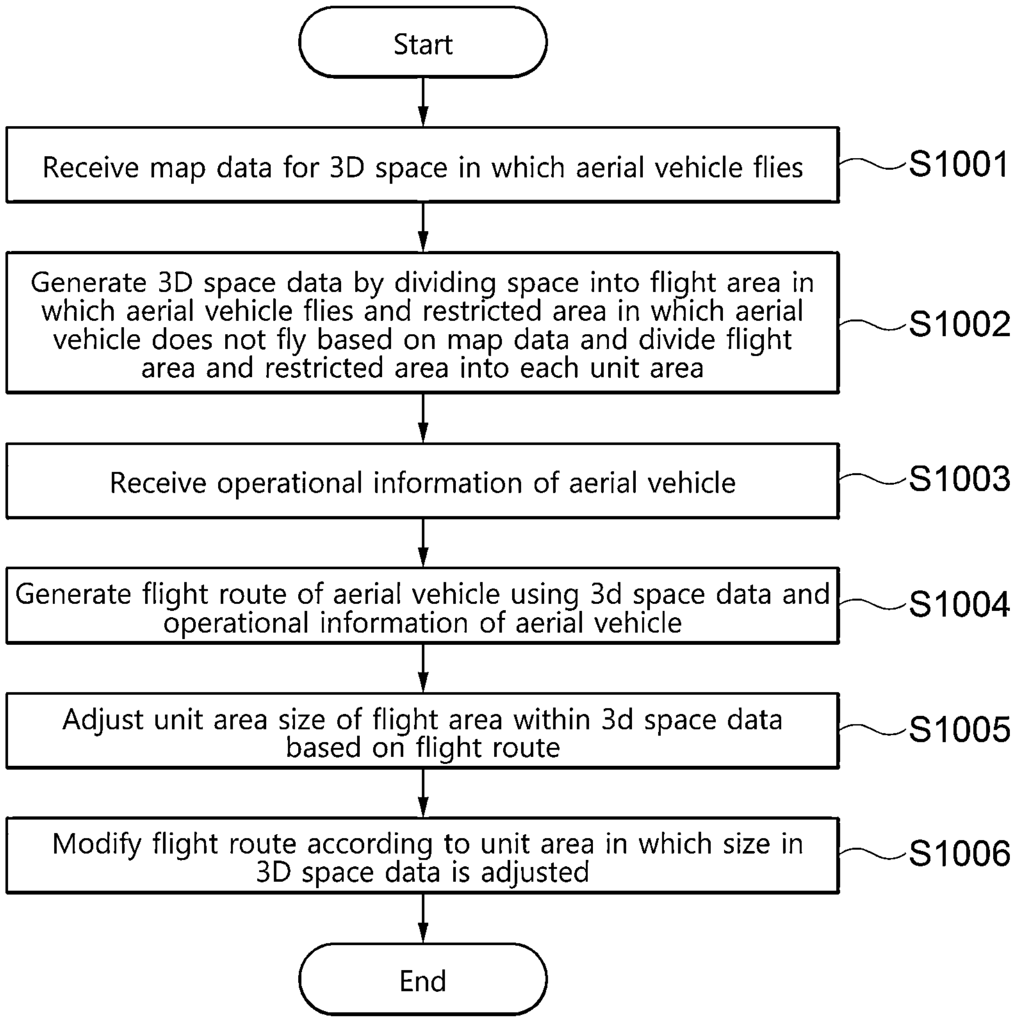
FIG. 15 is a flowchart illustrating a 3D space data generation method according to an embodiment of the present disclosure.

FIG. 15 is a flowchart illustrating a 3D space data generation method according to an embodiment of the present disclosure.

Referring to FIG. 15, the 3D space data generation device 1000 may receive map data for a 3D space in which an aerial vehicle flies (S1001). Here, the map data may include 3D geospatial information about a 3D space and obstacle information located in the 3D space.

In addition, the 3D space data generation device 1000 may generate the 3D space data by dividing the space into the flight area in which the aerial vehicle may fly and the restricted area in which the aerial vehicle may not fly based on the map data, and dividing the flight area and the restricted area into each unit area (S1002). Specifically, in the 3D space data generation step (S1002), the 3D space data generation device 1000 may divide the flight area into the first unit area and divide the restricted area into the second unit area, and the first unit area and the second unit area may have different sizes.

In addition, the 3D space data generation device 1000 may receive the operational information of the aerial vehicle (S1003) and generate the flight route of the aerial vehicle using the 3D space data and the operational information of the aerial vehicle (S1004). Specifically, in the flight route generation step (S1004), the 3D space data generation device 1000 may generate the flight route based on the flight area within the 3D space data.

Next, the 3D space data generation device 1000 may adjust the unit area size of the flight area within the 3D space data based on the flight route (S1005). Specifically, in the unit area size adjusting step (S1005), the 3D space data generation device 1000 may adjust the unit area size of the flight area adjacent to the restricted area when the flight route is adjacent to the restricted area, or adjust the unit area size of the flight area based on the flight speed and flight direction of the aerial vehicle.

The 3D space data generation device 1000 may modify the flight route according to the size-adjusted unit area in the 3D space data (S1006).

Thereafter, the modified flight route and 3D space data may be used for the flight of the aerial vehicle.

Figure 16:
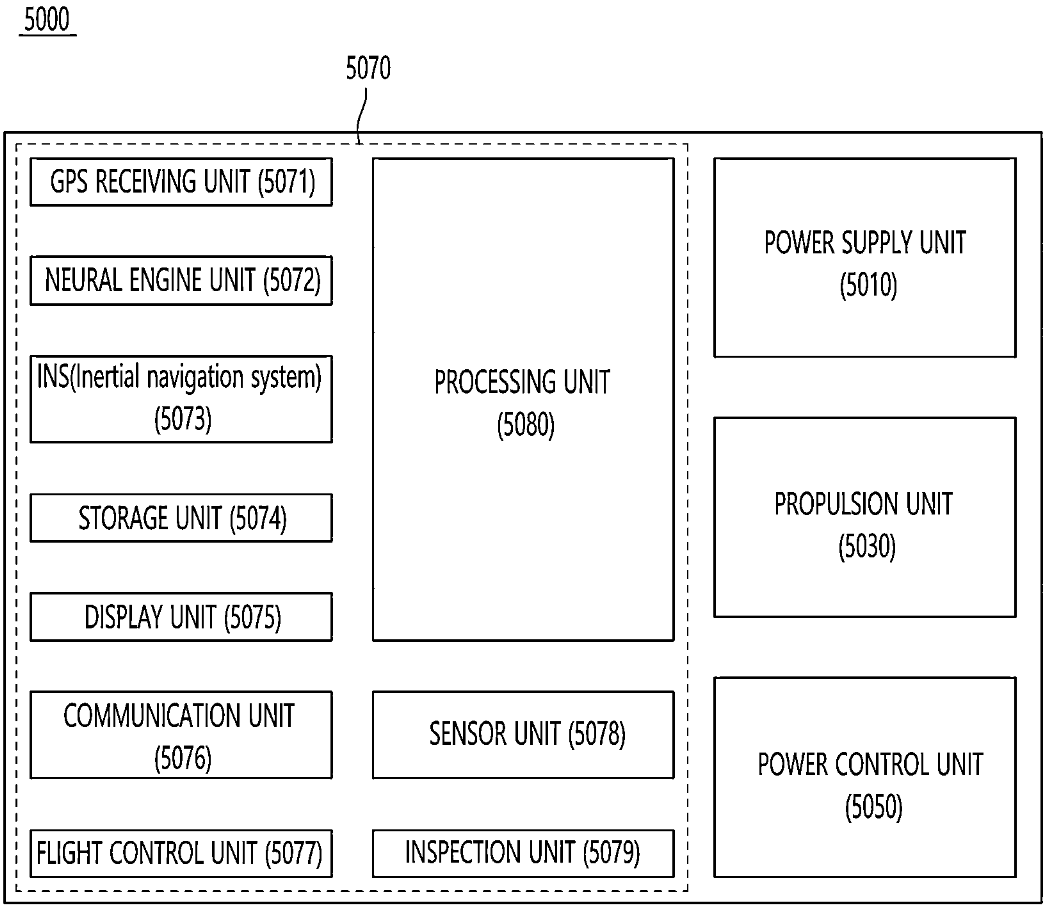
FIG. 16 is a block diagram illustrating a UAM EH 16 aerial vehicle according to an embodiment of the present disclosure.

FIG. 16 is a block diagram illustrating UAM aerial vehicle according to an embodiment of the present disclosure. Referring to FIG. 16, a UAM aerial vehicle 5000 may include a power supply unit 5010, a propulsion unit 5030, a power control unit 5050, and a flight control system 5070.

The UAM aerial vehicle 5000 of this embodiment may include a propulsion unit 5030 including a plurality of propulsion units, and a fan module including an electric fan motor and a propeller may be applied as an embodiment of the plurality of propulsion units.

The fan module may receive power through the power supply unit 5010, and control of each of the plurality of fan modules may be performed through the power control unit 5050.

Also, the power supply unit 5010 may selectively provide any one of power generated through an internal combustion engine and power generated through electric energy to the plurality of fan modules. More specifically, the power supply unit 5010 may include a fuel storage unit, an internal combustion engine, a generation, and a battery unit. The fuel storage unit may store fuel required for the operation of the aerial vehicle.

The fuel required for the operation of an aerial vehicle may include taxi fuel required for taxiing on the ground, trip fuel required for one-time landing approach and a missed approach by flying from a departure point to a destination, destination ALT fuel required to fly from the destination to the landing point in case of a nearby emergency, holding fuel required to stay in flight for a certain period of time with the expected weight of the aerial vehicle at the landing point of the destination, additional fuel in case more fuel is required due to a failure of engine, and pressurizer, etc., contingency fuel additionally loading a certain percentage of trip fuel to prepare for an emergency, etc.

The above-described type of fuel is one type for calculating fuel required for the operation of the aerial vehicle, and is not limited to the above-described type, and as will be described later, the amount of fuel stored in the fuel storage unit may be determined by considering the overall energy required for the operation of the aerial vehicle to reach the destination from the departure point together with the battery unit.

The internal combustion engine may generate power to drive a power generation unit by burning fuel stored in the fuel storage unit, and the power generation unit may generate electricity using power generated by the internal combustion engine and provide the power to the propulsion unit 5030.

The battery unit may be charged by receiving power from the power generation unit or by receiving power from the outside.

More specifically, fuel may be stored in the fuel storage unit and power may be supplied to the battery unit to be charged in consideration of total thrust energy required for the aerial vehicle to perform a mission.

However, when it is necessary to charge the battery unit according to the change in flight route due to the abnormal situation, the battery unit may be charged through the power generation unit as described above.

The power control unit 5050 may include a power supply path control unit, a power management control unit, and a motor control unit, and may be controlled through the flight control system 5070.

Here, the flight control system 5070 may receive a pilot's control, a pre-programmed autopilot program, etc., through the control signal of the flight control surface, and control the attitude, route setting, output, etc., of the aerial vehicle.

In addition, the flight control system 5070 may process control and operation of various blocks constituting the UAM aerial vehicle.

The flight control system 5070 may include all or part of a processing unit 5080, a GPS receiving unit 5071, a neural engine 5072, an inertial navigation system 5073, a storage unit 5074, a display unit 5075, a communication unit 5076, a flight control unit 5077, a sensor unit 5078, and an inspection unit 5079.

The processing unit 5080 may process various information and data for the operation of the flight control system 5070 and control the overall operation of the flight control system 5070. In particular, the processing unit 5080 may perform the function of the above-described 3D space data generation device 1000, and a detailed description thereof will be omitted.

The aerial vehicle may receive signals from GPS satellites through the GPS receiving unit 5071 to measure the location of the aerial vehicle.

The UAM aerial vehicle 5000 of this embodiment may receive information transmitted from control and base stations through the communication unit 5076. Examples of information transmitted from control and base stations may include weather information of a flight zone, no-fly zone information, flight information of other an aerial vehicles, etc., and information directly or indirectly affecting the flight route among the information received through the communication unit 5076 may be output through the display unit 5075.

The UAM aerial vehicle 5000 may perform communication with an external control base or other an aerial vehicle through the communication unit 5076. For example, the aerial vehicle may perform wireless communication with other UAM aerial vehicle, communication with the UAM operator 154 or the PSU 102, communication with a vertiport management system, and the like through the communication unit 5076.

The storage unit 5074 may store information such as various types of flight information related to the flight of the UAM aerial vehicle, flight plan, flight corridor information assigned from the PSU or UAM operator, track ID information, UAM flight data, and map data. Here, the flight information of the UAM aerial vehicle stored in the storage unit 5074 may exemplarily include location information, altitude information, speed information, flight control surface control signal information, propulsion control signal information, and the like of the aerial vehicle.

In addition, the storage unit 5074 may store a navigation map, traveling information, etc., necessary for the UAM aerial vehicle 5000 to travel from a departure point to a destination.

The neural engine 5072 may determine the failure or possibility of failure of each component of the UAM aerial vehicle 5000 through pre-trained data, and the training data may be accumulated through comparison with preset inspection results.

The inspection unit 5079 may compare an inspection result value obtained by inspecting the system of the UAM aerial vehicle 5000 with a preset result value. The above-described comparison may be performed sequentially while matching the components of the power unit and the control surface with the preset result value, and the process or result thereof may be identified to the pilot through the display unit 5075.

The sensor unit 5078 may include an external sensor module and an internal sensor module, and may measure the environment inside and outside the UAM aerial vehicle 5000. For example, the internal sensor module may measure the pressure, the amount of oxygen, etc., inside the UAM aerial vehicle 5000, and the external sensor module may measure the altitude of the UAM aerial vehicle 5000 and the existence of objects around the aerial vehicle, etc.

The inertial navigation system 5073 may use a gyro to create a reference table that maintains a constant attitude in an inertial space and is configured to include a precise accelerometer installed thereon, and may measure the current location of the aerial vehicle by obtaining the flight distance through the acceleration during the operation of the UAM aerial vehicle 5000.

The flight control unit 5077 may control the attitude and thrust of the UAM aerial vehicle 5000. More specifically, the flight control unit 5077 may receive the propulsion power control signal, the flight control surface control signal, etc., from the control surface, the UAM operator 154, the PSU 102, or the like, and control the flight force/control surface of the vehicle.

In addition, the flight control unit 5077 may control the operation of the power control unit 5050. Specifically, the power control unit 5050 may include a power supply path control unit, a power management control unit, and a motor control unit, and the power supply path control unit may select at least one of the power generation unit and the battery unit to supply power to at least one of the plurality of fan modules.

As an example of supplying power to a plurality of fan modules, the power supply path control unit may select at least one of the power generation unit or the battery unit as a power supply source based on the power required to generate the thrust of the aerial vehicle, and then may control RPM to be the same through RPM monitoring of the fan/propeller of the propulsion unit for generating the thrust.

In this case, the power supply control unit may monitor the status of the selected propulsion unit, determine whether there is an inoperative propulsion unit when an error occurs in any one of the selected at least one propulsion unit, and supply power by selecting the inoperative propulsion unit as an alternative propulsion unit when there is an inoperative propulsion unit.

In addition, when there is no inoperative propulsion unit, the power supply path control unit 651 may determine whether insufficient propulsion force can be offset by increasing the RPM of the propulsion unit 631 in normal operation, and if the offset is possible, supplement the insufficient thrust by controlling the propulsion unit in the normal operation, and perform an emergency landing procedure if offset is not possible.

The power management control unit may calculate thrust, power, energy, etc. required for the aerial vehicle to perform a mission, and determine power required for the power generation unit and the battery unit based on the calculated thrust, power, energy, etc.

The motor control unit may control lift, thrust, etc., provided to the aerial vehicle by controlling the fan module.

Meanwhile, the display unit 5075 may display data generated by the output data generation unit of a 3D space data generation device 1000.

Meanwhile, the methods according to various exemplary embodiments of the present disclosure described above may be implemented as programs and be provided to servers or devices. Therefore, the respective apparatuses may access the servers or the devices in which the programs are stored to download the programs.

In addition, the methods according to various exemplary embodiments of the present disclosure described above may be implemented as programs and be provided in a state in which it is stored in various non-transitory computer-readable media. The non-transitory computer-readable medium is not a medium that stores data therein for a while, such as a register, a cache, a memory, or the like, but means a medium that semi-permanently stores data therein and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to various embodiments of the present disclosure, it is possible to reduce data processing load by minimizing the capacity of 3D space data.

In addition, according to the present disclosure, it is possible to increase flight guidance accuracy by adjusting a size of a unit region in 3D space data according to a flight path.

The effects of the present disclosure are not limited to the above-mentioned effects, and other effects that are not mentioned may be obviously understood by those skilled in the art from the following description.

Although various embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, the scope of the present disclosure is not construed as being limited to the described embodiments but is defined by the appended claims as well as equivalents thereto.

What is claimed is:

1. A three-dimensional (3D) space data generation method for flight of an aerial vehicle, comprising:
- receiving map data for a three-dimensional (3D) space in which the aerial vehicle flies; and
- generating three-dimensional (3D) space data by dividing a space into a flight area in which the aerial vehicle flies and a restricted area in which the aerial vehicle does not fly based on the map data and dividing the flight area and the restricted area into each unit area,
- wherein, in the generating of the three-dimensional (3D) space data, the flight area is divided into a first unit area and the restricted area is divided into a second unit area,
- wherein the second unit area is a unit area larger in size than the first unit area,
- wherein, in the generating of the three-dimensional (3D) space data, adjacent restricted areas within a predetermined distance are defined as one unit area,
- wherein the predetermined distance corresponds to a minimum width required for the aerial vehicle to pass between the adjacent restricted areas,
- wherein the three-dimensional (3D) space data generation method generates the three-dimensional (3D) space data with lower capacity and reduces the data processing load of the aerial vehicle, and
- wherein a processor of the aerial vehicle receives an autopilot program and controls an attitude of the aerial vehicle.

2. The three-dimensional (3D) space data generation method of claim 1, wherein the map data includes three-dimensional (3D) geospatial information about the three-dimensional (3D) space and obstacle information located in the three-dimensional (3D) space.

3. The three-dimensional (3D) space data generation method of claim 1, wherein
- the first unit area and the second unit area have different sizes.

4. The three-dimensional (3D) space data generation method of claim 1, further comprising:
- generating a flight route of the aerial vehicle using the three-dimensional (3D) space data and operational information of the aerial vehicle.

5. The three-dimensional (3D) space data generation method of claim 4, further comprising:
- adjusting the unit area size of the flight area in the three-dimensional (3D) space data based on the flight route.

6. The three-dimensional (3D) space data generation method of claim 5, wherein, in the adjusting, when the flight route is adjacent to the restricted area, the unit area size of the flight area adjacent to the restricted area is adjusted.

7. The three-dimensional (3D) space data generation method of claim 5, wherein, in the adjusting, the unit area size of the flight area is adjusted based on a flight speed and a flight direction of the aerial vehicle.

8. The three-dimensional (3D) space data generation method of claim 5, wherein, in the adjusting, the unit area size of the flight area is adjusted based on a size of the aerial vehicle.

9. The three-dimensional (3D) space data generation method of claim 1, wherein, in the generating of the flight route, the flight route is generated based on the flight area within the three-dimensional (3D) space data.

10. A three-dimensional (3D) space data generation device for flight of an aerial vehicle, comprising:
- a processor receiving map data for a three-dimensional (3D) space in which the aerial vehicle flies; and
- the processor generating three-dimensional (3D) space data by dividing a space into a flight area in which the aerial vehicle flies and a restricted area in which the aerial vehicle does not fly based on the map data and dividing the flight area and the restricted area into each unit area,
- wherein the processor divides the flight area into a first unit area and the restricted area is divided into a second unit area,
- wherein the second unit area is a unit area larger in size than the first unit area,
- wherein the processor defines adjacent restricted areas within a predetermined distance into one unit area,
- wherein the predetermined distance corresponds to a minimum width required for the aerial vehicle to pass between the adjacent restricted areas,
- wherein the processor is configured to generate the three-dimensional (3D) space data with lower capacity and reduce the data processing load of the aerial vehicle, and
- wherein the processor is configured to receive an autopilot program and control an attitude of the aerial vehicle.

11. The three-dimensional (3D) space data generation device of claim 10, wherein the map data includes three-dimensional (3D) geospatial information about the three-dimensional (3D) space and obstacle information located in the three-dimensional (3D) space.

12. The three-dimensional (3D) space data generation device of claim 10, wherein the first unit area and the second unit area have different sizes.

13. The three-dimensional (3D) space data generation device of claim 10, further comprising:
- the processor generating a flight route of the aerial vehicle using the three-dimensional (3D) space data and operational information of the aerial vehicle.

14. The three-dimensional (3D) space data generation device of claim 10, wherein the processor generates the flight route based on the flight area within the three-dimensional (3D) space data.

15. The three-dimensional (3D) space data generation device of claim 14, further comprising:
- the processor adjusting the unit area size of the flight area in the three-dimensional (3D) space data based on the flight route.

16. The three-dimensional (3D) space data generation device of claim 15, wherein, when the flight route is adjacent to the restricted area, the processor adjusts the unit area size of the flight area adjacent to the restricted area.

17. The three-dimensional (3D) space data generation device of claim 15, wherein the processor adjusts the unit area size of the flight area based on a flight speed and a flight direction of the aerial vehicle.

18. The three-dimensional (3D) space data generation device of claim 15, wherein the processor adjusts the unit area size of the flight area based on a size of the aerial vehicle.

19. A non-transitory computer-readable recording medium containing instructions that, when executed by a processor, cause the processor to perform a three-dimensional (3D) space data generation method for flight of an aerial vehicle, the three-dimensional (3D) space data generation method comprising:

receiving map data for a three-dimensional (3D) space in which the aerial vehicle flies; and generating three-dimensional (3D) space data by dividing a space into a flight area in which the aerial vehicle flies and a restricted area in which the aerial vehicle does not fly based on the map data and dividing the flight area and the restricted area into each unit area, wherein, in the generating of the three-dimensional (3D) space data, the flight area is divided into a first unit area and the restricted area is divided into a second unit area, wherein the second unit area is a unit area larger in size than the first unit area, wherein, in the generating of the three-dimensional (3D) space data, adjacent restricted areas within a predetermined distance are defined as one unit area, wherein the predetermined distance corresponds to a minimum width required for the aerial vehicle to pass between the adjacent restricted areas, wherein the three-dimensional (3D) space data generation method generates the three-dimensional (3D) space data with lower capacity and reduces the data processing load of the aerial vehicle, and wherein a processor of the aerial vehicle receives an autopilot program and controls an attitude of the aerial vehicle.

* * * * *